(12) United States Patent
Justis et al.

(10) Patent No.: US 7,826,145 B2
(45) Date of Patent: Nov. 2, 2010

(54) FLUIDIC ADAPTIVE LENS SYSTEMS WITH PUMPING SYSTEMS

(75) Inventors: Nicole B. Justis, Cardiff-by-the-Sea, CA (US); De-Ying Zhang, San Diego, CA (US); Yu-Hwa Lo, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 501 days.

(21) Appl. No.: 11/577,905

(22) PCT Filed: Nov. 4, 2005

(86) PCT No.: PCT/US2005/039774
§ 371 (c)(1),
(2), (4) Date: Apr. 25, 2007

(87) PCT Pub. No.: WO2006/088514
PCT Pub. Date: Aug. 24, 2006

(65) Prior Publication Data
US 2009/0128922 A1    May 21, 2009

Related U.S. Application Data

(60) Provisional application No. 60/625,419, filed on Nov. 5, 2004.

(51) Int. Cl.
G02B 3/12    (2006.01)
G02B 7/02    (2006.01)
(52) U.S. Cl. .................. 359/666; 359/665; 359/819
(58) Field of Classification Search ............... 359/665, 359/666, 667, 676, 819
See application file for complete search history.

(56) References Cited

U.S. PATENT DOCUMENTS 4,890,903 A    1/1990    Treisman et al. ............ 359/666

(Continued)

FOREIGN PATENT DOCUMENTS

GB    2184562    6/1987

(Continued)

OTHER PUBLICATIONS

Printout of search result listing concerning GB2184562 obtained using Google search engine, printed on Jun. 26, 2008.

(Continued)

*Primary Examiner*—Mohammed Hasan
(74) *Attorney, Agent, or Firm*—Perkins Coie LLP

(57) ABSTRACT

The present invention in various embodiments relates to a variety of different types of fluidic adaptive lens systems, pumping systems for implementation in such lens systems, other systems employing such lens systems, and related methods of fabrication. In at least some embodiments, the present invention relates to a lens system that includes a reservoir having at least one flexible wall, a first actuator coupled in relation to the reservoir, and a terminal at which is located at least one of an integrated fluidic lens and a port configured to be coupled to an external fluidic lens. The terminal is coupled to at least one of the reservoir and the actuator, and at least one of the actuator and a first pumping system including the actuator is capable of causing fluid to be moved at least one of from the reservoir toward the terminal, and from the terminal toward the reservoir.

36 Claims, 12 Drawing Sheets

U.S. PATENT DOCUMENTS

| | | | |
|---|---|---|---|
| 5,233,470 A | 8/1993 | Wu | 359/666 |
| 5,446,591 A | 8/1995 | Medlock | 359/666 |
| 5,917,657 A | 6/1999 | Kaneko et al. | 359/661 |
| 6,081,388 A * | 6/2000 | Widl | 359/666 |
| 6,188,526 B1 | 2/2001 | Sasaya et al. | 359/666 |
| 6,369,954 B1 | 4/2002 | Fourier | 359/666 |
| 6,618,208 B1 | 9/2003 | Silver | 359/666 |
| 6,737,646 B2 | 5/2004 | Schwartz | 250/306 |
| 6,891,682 B2 | 5/2005 | Aizenberg et al. | 359/738 |
| 6,999,238 B2 | 2/2006 | Glebov et al. | 359/619 |
| 7,126,903 B2 | 10/2006 | Feenstra | 369/112.23 |
| 7,256,943 B1 * | 8/2007 | Kobrin et al. | 359/666 |
| 7,367,550 B2 | 5/2008 | Lee | 261/81 |
| 7,453,646 B2 * | 11/2008 | Lo | 359/665 |
| 2001/0017985 A1 | 8/2001 | Tsuboi et al. | |
| 2002/0176148 A1 | 11/2002 | Onuki et al. | |
| 2003/0095336 A1 | 5/2003 | Floyd | |

FOREIGN PATENT DOCUMENTS

| | | |
|---|---|---|
| JP | 2002169005 | 6/2002 |
| WO | 0058763 A1 | 10/2000 |

OTHER PUBLICATIONS

Jo, Byung-Ho, et al., Journal of Microelectromechanical Systems, vol. 9, No. 1, Mar. 2000, pp. 76-81.

Xia, Younan, et al., Angew. Chem. Int. Ed., 1998, 37, pp. 550-575, March.

University of Wisconsin-Madison College of Engineering, Autonomous lenses may bring microworld into focus, vol. 33, No. 1, Fall 2006, pp. 1 and 3, December.

* cited by examiner

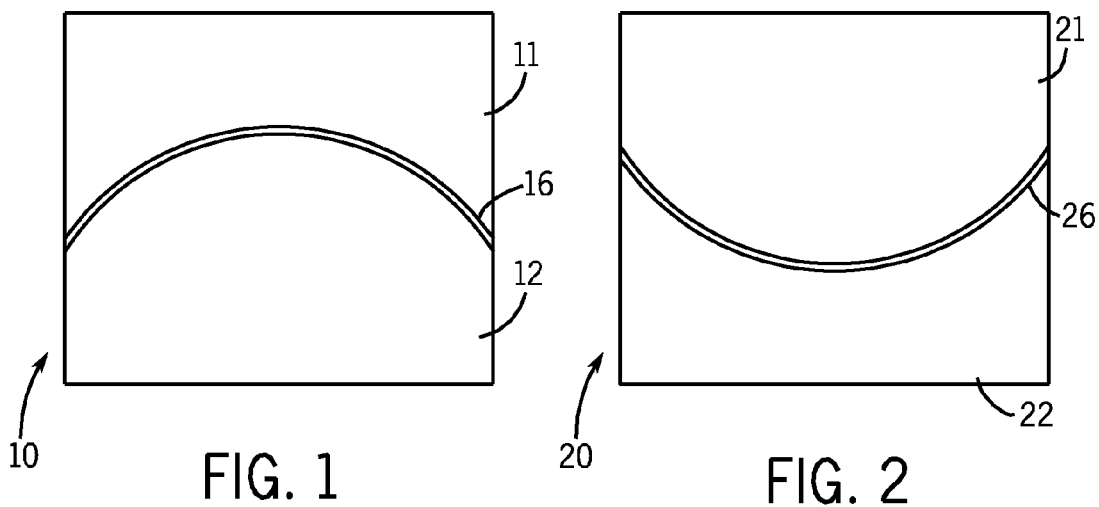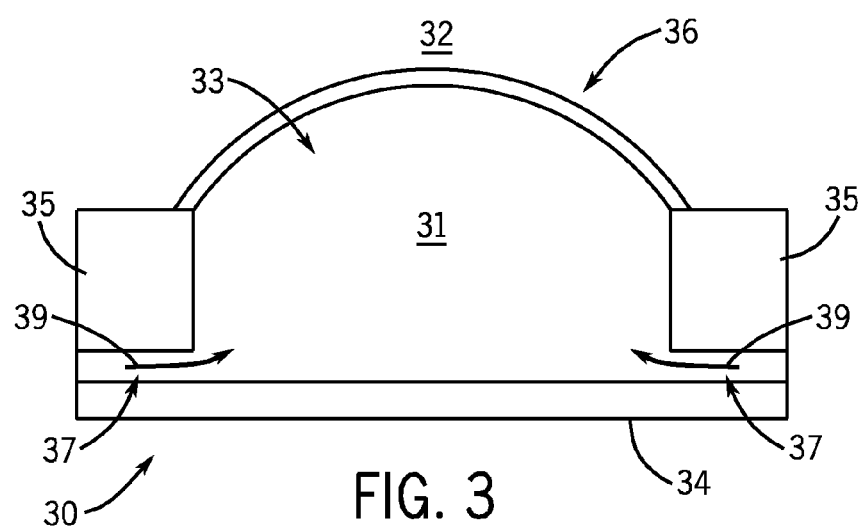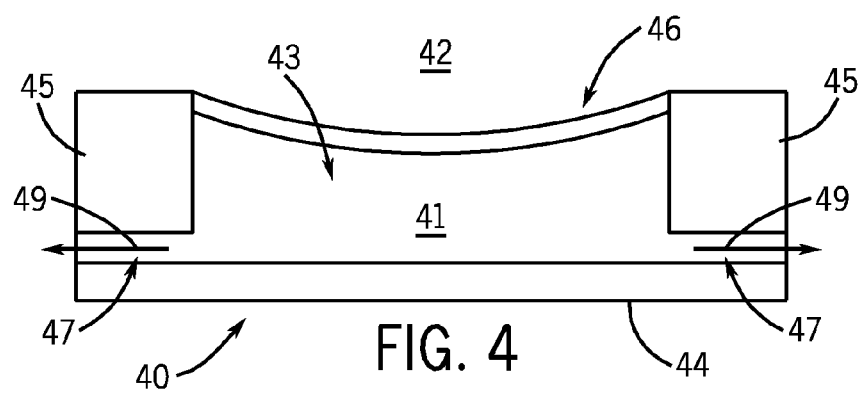

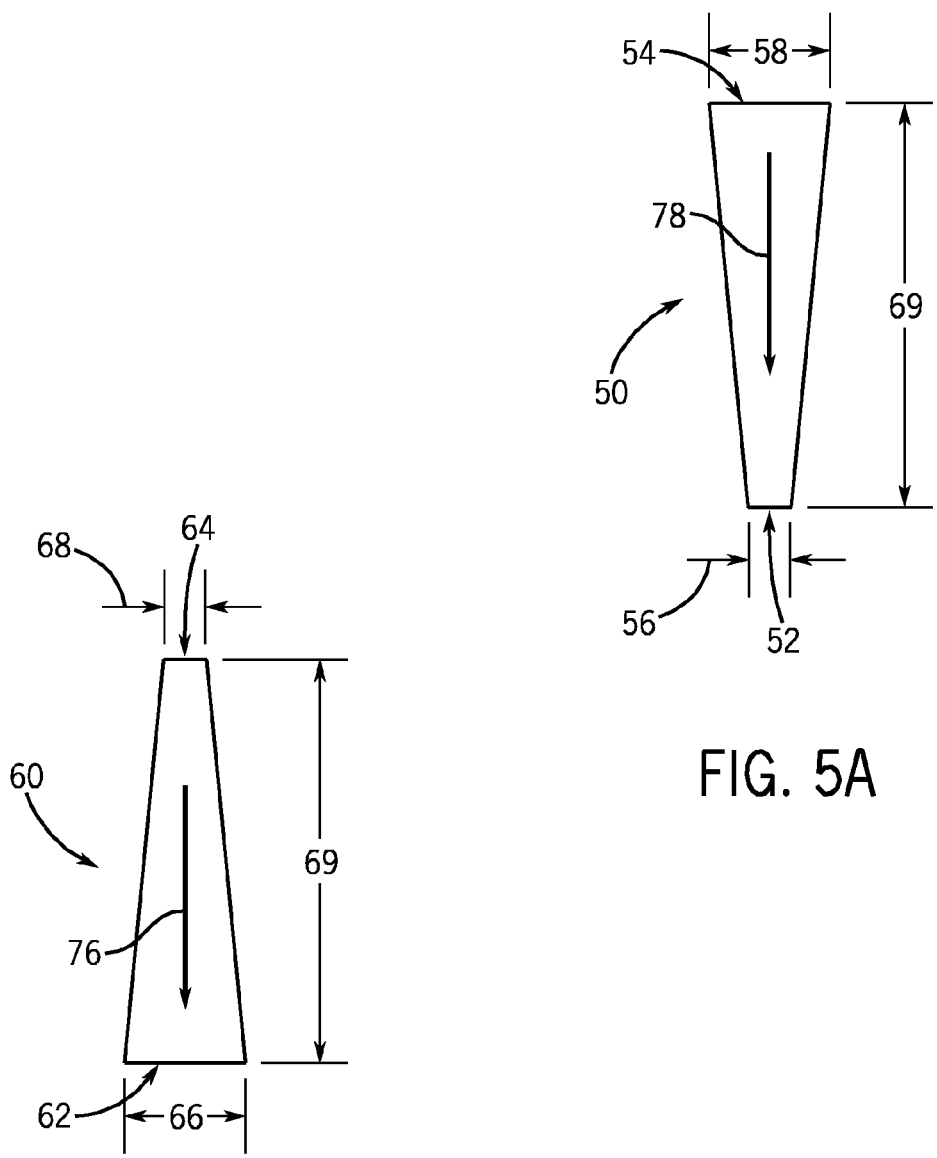
FIG. 5A
FIG. 5B
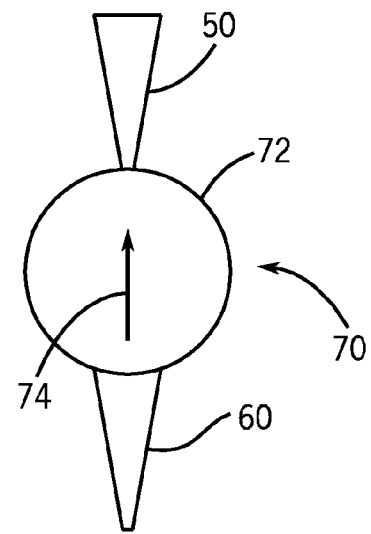
FIG. 6

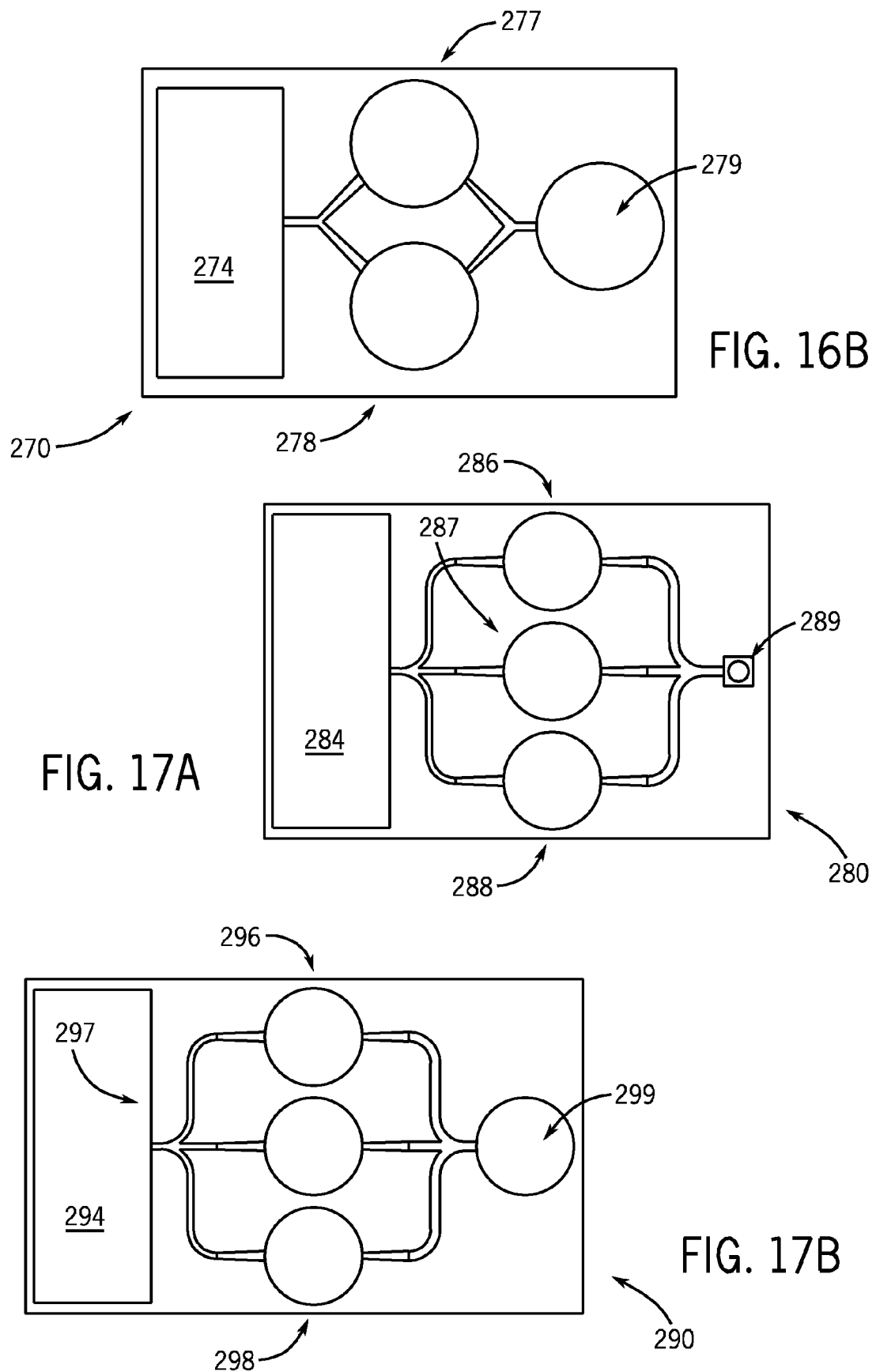

FLUIDIC ADAPTIVE LENS SYSTEMS WITH PUMPING SYSTEMS

CROSS-REFERENCE TO RELATED APPLICATIONS

This application claims the benefit of U.S. provisional patent application No. 60/625,419 entitled "Tunable Fluidic Lenses With Integrated Micropumps" filed on Nov. 5, 2004, which is hereby incorporated by reference herein.

STATEMENT REGARDING FEDERALLY SPONSORED RESEARCH OR DEVELOPMENT

This invention was made with United States Government support awarded by the following agency: United States Air Force/Air Force Office of Scientific Research (USAF/AFOSR) Grant No. F49620-02-1-0426. The United States Government has certain rights in this invention.

FIELD OF THE INVENTION

The present invention relates to optical lenses such as can be employed in vision correction glasses, microscopes, zoom lens systems, cameras, and other applications.

BACKGROUND OF THE INVENTION

Optical lenses are employed in a variety of devices for many purposes such as modifying focus and magnification. Many conventional devices that employ optical lenses use lenses that are made from solid materials, such that the optical properties of the lenses (e.g., their focal distances) remain constant or nearly constant over time. For example, eyeglasses used for vision correction typically are made of solid materials such as glass and plastic. Similarly, cameras and other optical systems such as microscopes, video monitors, video recorders, copy machines, scanners, etc. commonly employ solid lenses.

Although lenses made from solid materials generally maintain their optical properties over time, the use of such lenses also has numerous disadvantages, as discussed in PCT patent application no PCTUS05/10948 filed on Mar. 31, 2005 and U.S. provisional patent application No. 60/558,293 filed on Mar. 31, 2004, both entitled "Fluidic Adaptive Lens", and both of which are incorporated by reference herein. To begin with, solid material lenses are disadvantageous insofar as such lenses are typically difficult and costly to manufacture, and nearly impossible to mass produce at low cost. Further, solid material lenses are disadvantageous insofar as such lenses have magnification powers (and other characteristics) that are fixed at the time of fabrication. Because such lenses have fixed magnification powers (and other characteristics), such lenses by their nature only are able to meet the needs of their users (human or mechanical) for limited periods of time or under certain circumstances. As the users' needs evolve over time or users' circumstances change, the users need to replace or change the lenses being used. The use of combination-type lens devices such as bifocals, while helpful in certain regards, only partially alleviates these problems.

The aforementioned patent applications describe a new type of lens system that employs one or more lenses that are variable or adaptive in terms of their optical properties. Such lenses having adaptive optical properties can be formed, without the use of complicated mechanical or moving parts, through the use of one or more optically conductive flexible diaphragms/membranes that respectively separate pairs of fluidic media having different refractive indices. The pressure(s) of one or more of the fluidic media applied to the flexible diaphragms/membranes can be varied over time so as to alter the positioning of the diaphragms/membranes and the relative positioning of the media, which in turn alters the optical properties of the lenses formed at least in part by those diaphragms/membranes and fluidic media.

Such fluidic adaptive lenses can be implemented and operated through the use of miniaturized mechanical pumps connected to the lenses via macroscopic fluidic connectors. However, the use of such devices is disadvantageous in certain regards. To begin with, the mechanical nature of such pumps (whether they are peristaltic, rotary, or injection-type pumps) increases their chance of failure. Additionally, because such mechanical pumps employ separate actuation elements that rely on relatively large volumetric strokes (e.g., several micrometers or greater) at relatively low frequencies (e.g., 100 Hz or less), these pumps result in rather inaccurate lens tuning, and relatively slow fluidic response and associated slow lens tuning time. Further, the use of such mechanical pumps results in a relatively bulky, expensive system assembly. Similarly, the use of macroscopic fluidic connectors to connect the pumps to the lenses increases the overall size of, and the complexity and expense of fabricating, the combined lens and pump system.

Therefore, it would be advantageous if adaptive fluidic lenses could be implemented in a different manner than through the use of mechanical pumps connected via macroscopic fluidic connectors. In particular, it would be advantageous if a new pumping technology could be developed that in at least some embodiments provided more accurate and/or rapid tuning operation than such mechanical pumps with macroscopic fluidic connectors. Further, it would be advantageous if in at least some embodiments such a new pumping technology was less complex and/or expensive to manufacture and implement than such mechanical pumps with macroscopic fluid connectors. Additionally, it would be advantageous if in at least some embodiments such a new pumping technology resulted in a more compact, and/or more robust, combined pump-lens system than the use of such mechanical pumps with macroscopic fluid connectors.

BRIEF SUMMARY OF THE INVENTION

The present inventors have recognized the desirability of providing improved devices for implementing/operating fluidic adaptive lenses. More particularly, the present inventors have recognized the desirability of providing improved fluid control or "pumping" devices that allow for fluid to be moved into or out of (and/or fluid pressure to be varied within) lens cavities of fluidic adaptive lenses, so as to achieve changes in the lens properties (e.g., changes in the focal length of the fluidic adaptive lens) by modifying the position of a flexible membrane. The present inventors have further developed a variety of different embodiments of pumping systems and tunable lens systems employing such pumping systems. At least some pumping systems in accordance with at least some embodiments of the present invention are capable of more precisely and rapidly effecting changes in lens properties than is possible using conventional pumping systems, and/or are of less weight or bulkiness (even to the point of being comparable in weight and size to the lenses themselves) than conventional systems.

In at least some embodiments, the present invention relates to a tunable lens system that includes a reservoir having at least one flexible wall, a first actuator coupled in relation to the reservoir, and a terminal at which is located at least one of an integrated fluidic lens and a port configured to be coupled to an external fluidic lens. The terminal is coupled to at least one of the reservoir and the actuator, and at least one of the actuator and a first pumping system including the actuator is capable of causing fluid to be moved at least one of from the reservoir toward the terminal, and from the terminal toward the reservoir.

Additionally, in at least some embodiments, the present invention relates to a pumping system that includes an actuator and at least one of a nozzle and a diffuser coupled to the actuator.

Further, in at least some embodiments, the present invention relates to a pumping system for a fluidic lens system that includes a fluid reservoir, a coil positioned in relation to the fluid reservoir and capable of generating an electromagnetic field, and at least one component that is responsive to the electromagnetic field. In at least some circumstances the generating of the electromagnetic field causes a change in volume of the fluid reservoir.

Additionally, in at least some embodiments, the present invention relates to a structure capable of being implemented in a fluidic adaptive lens system. The structure includes a plurality of walls at least partially defining a plurality of open-sided cavities, and at least one flexible membrane being coupled to at least some of the plurality of walls so as to additionally define the plurality of open-sided cavities. At least two of the cavities are connected with one another, each of the cavities as additionally defined by the at least one flexible membrane is capable of being implemented as at least part of at least one of a fluidic adaptive lens, a fluidic reservoir, and a pump cavity of an actuator.

Further, in at least some embodiments, the present invention relates to a method of fabricating a fluidic adaptive lens device. The method includes providing a structure having a first open-sided cavity formed therewithin, and affixing a flexible membrane to the structure in a manner sealing the cavity except insofar as at least one channel within at least one of the structure and the membrane allows for communication of a fluid with respect to the cavity. Also, the method includes affixing an actuator assembly to the flexible membrane.

Additionally, in at least some embodiments, the present invention relates to a variety of systems, devices and/or applications (e.g., zoom lens systems) that can employ fluidic adaptive lens systems such as those described herein, and/or to integrated microchip designs for such fluidic adaptive lens systems.

BRIEF DESCRIPTION OF THE DRAWINGS

FIGS. 1 and 2 show, in simplified schematic form, cross-sectional views of exemplary convex and concave fluidic adaptive lenses, respectively.

FIGS. 3 and 4 show, in simplified schematic form, cross-sectional views of exemplary convex and concave fluidic adaptive lenses, respectively, including related support structures;

FIGS. 5A and 5B respectively show, in schematic form, an exemplary nozzle and an exemplary diffuser such as can be implemented within tunable lens systems in accordance with at least some embodiments of the present invention;

FIG. 6 shows in schematic form an exemplary configuration of a nozzle and diffuser such as those of FIGS. 5A and 5B in relation to an actuator, in accordance with at least some embodiments of the present invention;

FIGS. 15A-15B, 16A-16B and 17A-17B show top plan views of further exemplary tunable lens systems employing two or more pumping systems, in accordance with at least some embodiments of the present invention;

DETAILED DESCRIPTION OF THE PREFERRED EMBODIMENT

Figure 7:
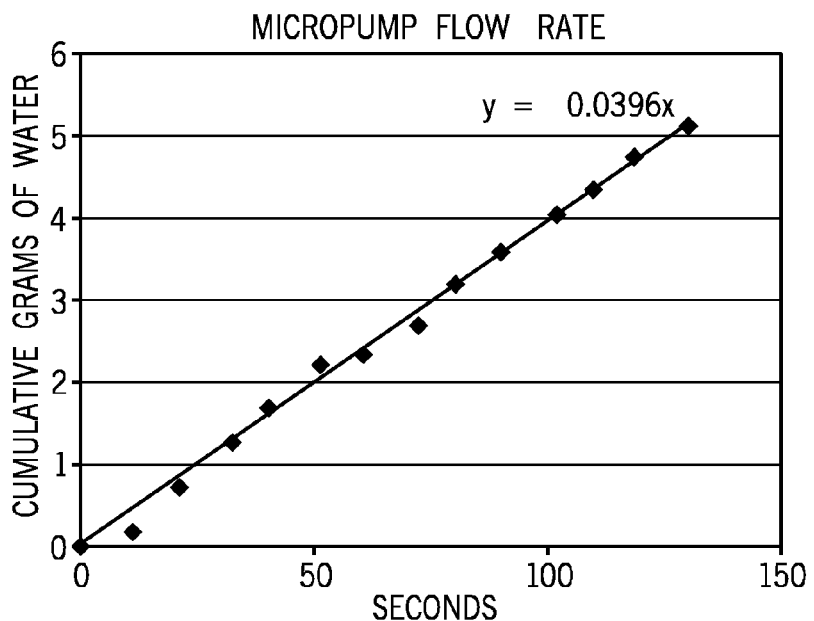
FIG. 7 is a graph showing exemplary flow rates achieved by an exemplary micropump in accordance with one embodiment of the present invention.

Referring to FIGS. 1-4, cross-sections of exemplary fluidic adaptive lenses are shown in schematic form. As particularly shown in FIG. 1, a first fluidic adaptive lens (or simply fluidic lens) 10 is a convex lens that includes a first medium 12 that is a higher index fluid, a second medium 11 that is a lower index fluid, and a flexible membrane or diaphragm 16 that separates the two media. The flexible membrane 16 is bent toward the side of the second medium 11 (the lower index side) as shown due to the pressure of the first medium 12 being greater than that of the second medium (plus some minimal pressure exerted by the membrane itself). In contrast to FIG. 1, FIG. 2 shows a second fluidic lens 20 that is a concave lens that includes a first medium 22 that is a higher index fluid, a second medium 21 that is a lower index fluid, and a flexible membrane (or diaphragm) 26 that separates the two media. The membrane 26 in contrast to the membrane 16 is bent toward the side of the first medium 22 (the higher index side) as shown due to the pressure of the first medium being less than that of the second medium 21.

Although the fluidic lenses 10, 20 are described above as constituting two different lenses, it should be understood that each of the fluidic lenses can be formed using the same adaptive lens structure. The respective flexible membranes 16, 26 are deformed in the particular manners shown due to the particular pressure differences that exist between the respective pairs of media 11, 12 and 21, 22. Nevertheless, the convex, first fluidic lens 10 could be modified to become the concave, second fluidic lens 20 simply by modifying the relative pressures of the media 11, 12 such that the pressure associated with the first medium 12 was less than that of the second medium 11. Likewise, the concave, second fluidic lens 20 could be modified to become the convex, first fluidic lens 20 simply by modifying the relative pressures of the media 21, 22 such that the pressure associated with the first medium 22 was greater than that of the second medium 21.

Further, the membranes 16, 26 are not restricted to the two particular concave/convex positions shown in FIGS. 1 and 2, but rather can be bent or distorted to a variety of different degrees depending upon the particular pressure differences that are applied. If there is no pressure differential between the respective media about a given membrane, then the membrane would become flat.

Turning to FIGS. 3 and 4, cross-sections of additional exemplary fluidic lenses 30, 40 are shown in schematic form. As shown, the lens 30 of FIG. 3 is a convex lens like the lens 10 of FIG. 1, while the lens 40 of FIG. 4 is a concave lens like the lens 20 of FIG. 2. Further as shown, each of the lenses 30 and 40 respectively includes a first fluidic medium 31 and 41, respectively, a second fluidic medium 32 and 42, respectively, and a flexible membrane (or diaphragm) 36 and 46, respectively. In the present embodiment, the second fluidic media 32, 42 are shown as air outside of the lenses 30, 40, although those fluidic media could be other fluids (gaseous or liquid) as well.

Although similar to the lenses 10, 20 of FIGS. 1 and 2, the lenses 30, 40 of FIGS. 3 and 4 are shown in greater detail to include not only flexible membranes/diaphragms and surrounding fluidic media, but also support structures. More particularly, as shown, each of the lenses 30, 40 includes a segment of transparent rigid material 34 and 44, respectively. Additionally, each of the lenses 30, 40 includes one or more respective walls 35, 45 that support the respective membranes 36, 46 with respect to the respective segments of transparent rigid materials 34, 44. Assuming that the lenses 30, 40 are circular in their general configuration (as viewed perpendicularly to the cross-sectional views shown in FIGS. 3-4), each of the walls 35, 45 can be understood as including only a single, cylindrical wall. However, in alternate embodiments (including embodiments where the lenses 30, 40 are rectangular or take some other non-circular shape), each of the lenses 30, 40 could have more than one wall corresponding to the walls 35, 45.

Further as shown in FIGS. 3 and 4, the walls 35, 45 along with the membranes 36, 46 and the segments of transparent rigid material 34, 44 define respective internal cavities 33, 43 within which are the first fluidic media 31, 41. Also, the walls 35, 45 define respective channels 37, 47 by which the first fluidic media 31, 41 can enter and exit the cavities 33, 43. Although FIGS. 3 and 4 show the walls 35, 45 as being separated from the segments of transparent rigid material 34, 44, it should be understood that this appears to be the case because the particular cross-sections shown in FIGS. 3 and 4 are taken through the channels 37, 47. That is, at other locations where channels are not present, the segments of transparent rigid material 34, 44 are in direct contact with the walls 35, 45.

Arrows 39, 49 respectively represent the directions of the flow (and/or pressure) of the media 31, 41 with respect to the cavities 33, 43 that are appropriate for causing the respective lenses 30, 40 to become convex and concave, respectively. More specifically, if the first fluidic medium 31 is driven to flow into the cavity 33 as shown in FIG. 3, the membrane 36 expands outward away from the segment of transparent rigid material 34, while if the first fluidic medium 41 is driven (or allowed) to flow out of the cavity 43 as shown in FIG. 4, the membrane 46 tends to contract inward toward the segment of transparent rigid material 44. By controlling the amounts of the first fluidic media 31, 41 that flow in and out of the cavities 33, 43, the optical properties (e.g., focal lengths) of the lenses 30, 40 can be varied.

In order to cause such flow into or out of the cavities 33, 43 and to achieve desired optical properties, appropriate pressures are applied to the media 31, 41 by pumping mechanisms such as those discussed in more detail below. In particular, because in the present embodiment the second fluidic media 32, 42 are the air of the atmosphere, by applying a positive pressure to the first fluidic medium 31 (e.g., a pressure greater than the atmospheric pressure), the membrane 36 tends to expand outward as shown in FIG. 3. Inversely, by applying a negative pressure to the first fluidic medium 41 (e.g., a pressure less than the atmospheric pressure), the membrane 46 tends to contract inward as shown in FIG. 4.

Although the lenses 30, 40 shown in FIGS. 3 and 4 are capable of operating as lenses (e.g., capable of causing light to be focused or to be dispersed), the structures of theses lenses are not preferred in all situations. Because the membranes 36, 46 in the present embodiment are exposed to the outside atmosphere and outside environment, atmospheric pressure changes, temperature changes and/or external impacts can damage the lenses and/or otherwise cause changes in the optical properties of the lenses 30, 40. Consequently, while the lenses 30, 40 function well in many circumstances, in at least some circumstances these lenses are insufficiently stable (e.g., due to drift of the lenses' optical performance) or otherwise suffer from reliability or performance issues. This can particularly be the case when the lenses are intended to be operated in the mode of the concave lens 40 of FIG. 4 since, for proper operation of the lens 40 as a concave lens, a negative pressure needs to be maintained in the cavity 43 relative to the atmosphere. Maintaining such a negative pressure requires that the lens 40 have an air-tight design, something which is hard to achieve and keep stable. By comparison, proper operation of the lens 30 as a convex lens only requires that the lens have a leak-tight design, something which is easier to achieve and keep stable.

Thus, although FIGS. 1-4 illustrate several embodiments of fluidic lenses, the present invention is also intended to be applicable to a wide variety of other types of fluidic lenses as well. Such other fluidic lenses can be preferable for a variety of reasons depending upon the circumstance. For example, in physical circumstances that are more demanding, alternate embodiments of fluidic lenses other than those shown in FIGS. 1-4 can be employed that are more robust or preferred for other reasons. Such alternate embodiments of fluidic lenses can employ, for example, lenses having multiple enclosed cavities/chambers (rather than merely one enclosed cavity as in the embodiments of FIGS. 3-4) that are separated by way of one or more flexible membranes. Further for example, some such lenses could employ membranes only internally between different internal fluid cavities, and employ robust surfaces such as the walls 35,45 and segments of transparent rigid material 34,44 along their outer surfaces. A variety of such lenses and lens structures are disclosed in the aforementioned U.S. provisional and PCT patent applications entitled "Fluidic Adaptive Lens" incorporated by reference herein.

Turning to FIGS. 5-6, the present invention relates to new pumping mechanisms/circuits/systems that can be employed in relation to fluidic lenses such as those described with reference to FIGS. 1-4, as well as various resulting combination lens-pump systems (see also FIG. 10 et seq.). As discussed in further detail below, at least some embodiments of the present invention provide a low-cost, compact, simple-to-manufacture, easily-controlled, and energetically efficient system and method for controlling the fluidic pressure(s) within fluidic lenses such as those described above, and thus for controlling the fluidic pressures applied to lens membrane(s) within such fluidic lenses, so as to produce pressure differentials on opposite sides of those lens membrane(s) and produce desired lens curvatures and associated focal lengths and/or magnification levels. Further as discussed below, in at least some embodiments, the pumping systems disclosed herein serve to create pressure differentials across the pumping systems between the lens cavities (e.g., the cavities 33, 43 discussed above with respect to FIGS. 3-4) and fluid reservoirs, without the use of any valve(s) or complicated mechanical parts. The pumping systems in accordance with at least some embodiments of the present invention can be utilized in a variety of applications that employ fluidic adaptive or "tunable" lenses and/or fluid reservoirs, and the overall combination of one or more of such lenses and/or fluid reservoirs with such pumping systems/circuits/mechanisms into an integrated device can be termed a "tunable" lens system.

Referring still to FIGS. 5-6, in accordance with at least some embodiments of the present invention, special fluidic channel and actuator designs are employed that utilize one or more "nozzle" and/or "diffuser" channels in combination with an actuator component residing on a membrane. In this regard, FIGS. 5A and 5B show an exemplary nozzle 50 and diffuser 60, respectively, while FIG. 6 provides a schematic view of an overall pumping system 70 employing both the nozzle and diffuser. As shown in FIG. 5B, the diffuser 60 has a horn-shaped geometry with an outlet 62 and an inlet 64. A cross-sectional diameter or width 66 of the outlet 62 is wider than a cross-sectional diameter or width 68 of the inlet 64, and a length 69 of the diffuser 60 is greater than either of the widths 66, 68. Flow through the diffuser 60 occurs (or is assumed to occur) in a direction indicated by an arrow 76. Although in some embodiments the horn-shaped geometry of the diffuser 60 can take on a substantially conical shape, in other embodiments, that geometry encompasses other forms including, for example, wedge-shapes (thus, in at least some embodiments, the inlets and outlets need not be circular, but rather could be rectangular or take on some other shape).

As shown in FIG. 5A, the nozzle 50 has essentially the same shape (and length 69) as the diffuser 60, but is oppositely-configured in relation to the diffuser. More specifically, while the diffuser 60 is a horn-shaped channel in which fluid flow occurs (or is assumed to occur) from the narrower inlet 64 toward the wider outlet 62, the nozzle 50 is a horn-shaped channel in which fluid flow occurs (or is assumed to occur) from a wider inlet 54 (having a width 58) toward a narrower outlet 52 (having a width 56). That is, flow through the nozzle 50 proceeds (or is assumed to proceed) in a direction indicated by an arrow 78. Again, although in some embodiments the horn-shaped geometry of the nozzle 50 can take on a substantially conical shape, in other embodiments, that geometry encompasses other forms including, for example, wedge-shapes.

From the description of the nozzle 50 and diffuser 60 components shown in FIGS. 5A and 5B, it will be apparent that the two components have (or can have) an identical structure, such that a nozzle can be operated as a diffuser, and vice versa. As a result, whether a given nozzle/diffuser-type component is considered a nozzle or a diffuser is merely a matter of convention. That is, whether a channel is operating as, or is considered to be, a nozzle or a diffuser often largely if not entirely depends upon its position/function in relation to an overall pumping system of which that channel forms a part, or assumptions that are made regarding how fluid might potentially flow through the channel.

FIG. 6 shows an exemplary pumping system 70 that employs two nozzle/diffuser-type components 50, 60 in addition to an actuator 72 positioned between the two nozzle/diffuser-type components. One of the nozzle/diffuser-type components 50, 60, namely the component 60, has its wider end coupled to the actuator 72, while the other of the components, namely the component 50, has its narrower end coupled to the actuator. According to one convention, and as shown in FIG. 6, the component 60 is considered to be a diffuser while the component 50 is considered to be a nozzle since, in order for fluid to flow through the component 60 so as to arrive at the actuator 72, the fluid would have to follow the direction represented by the arrow 76 of FIG. 5B, while in order for fluid to flow through the component 50 so as to arrive at the actuator, the fluid would have to follow the direction represented by the arrow 78 of FIG. 5A. That is, the component 60 is a diffuser and the component 50 is a nozzle based upon a convention in which the "assumed flow direction" of the component is the direction of flow necessary to proceed toward the actuator.

At the same time, it should be noted that the present convention by which the component 50 is considered a "nozzle" and the component 60 is considered a "diffuser" could be reversed if one used as a reference the direction of flow away from the actuator. In that case, the component 50 would be a "diffuser" and the component 60 would be a "nozzle." Also, for reasons that will be described in greater detail below, during actual operation of the actuator 72 of the pumping system 70, flow proceeds in the direction indicated by the arrow 74 through all three components 50, 60 and 72. Thus, if one considered actual flow patterns through the pumping system 70 in determining the convention as to whether the components 50, 60 should be a diffuser or nozzle, both of components 50 and 60 would each be considered a diffuser. Thus, it should be understood that the terms "nozzle" and "diffuser" are used merely as a matter of convenience to distinguish between two structures that are identical (or at least similar) but in some respect serve inverted functions.

As discussed in greater detail with reference to FIGS. 10-12, in at least some embodiments of the present invention, the actuator 72 includes a vibrational component, a membrane (or diaphragm), and a pump cavity or chamber on the other side of the membrane, where the cavity is coupled between the nozzle/diffuser components. The actuator 72 operates by applying vibrational energy onto the membrane, which in turn transmits that energy into the pump cavity on the other side of the membrane. More particularly, the vibrational component can be controlled electronically to impart a force on the pump membrane, which in turn deforms and creates pressure within the pump cavity. For reasons that will be described in greater detail below, when the actuator 72 transmits the vibration energy to the fluid within the pump cavity by way of the membrane on which it resides, flow is pulled from the diffuser 60 (as viewed by the actuator) and pushed into the nozzle 50 (as viewed by the actuator). Thus, fluid flows from a chamber attached to the other side of the diffuser 60 opposite the actuator 72 to a chamber attached to the other side of the nozzle 50 opposite the actuator. Thus, in the embodiment shown in FIG. 6, fluid flow occurs in the direction indicated by an arrow 74.

In the present embodiment, fluid directionality through the pumping system 70 depends upon the orientations of the nozzle 50/diffuser 60 in relation to a fluid reservoir chamber and lens chamber. If it is the lens chamber (e.g., one of the cavities 33, 43 of the fluidic lenses 30, 40 of FIGS. 3 and 4) that is coupled to the nozzle 50 and the fluid reservoir (or other fluid source) that is coupled to the diffuser 60, operation of the pumping system 70 tends to cause fluid flow from the reservoir toward the lens chamber, and thus to increase the pressure within the lens chamber. In at least some embodiments, fluid flow in this manner could create a convex lens such as that shown in FIG. 3. If it is the lens chamber that is coupled to the diffuser 60 and the nozzle 50 that is coupled to the fluid reservoir, operation of the pumping system 70 tends to cause fluid flow toward the reservoir and away from the lens chamber, and thus tends to decrease the pressure within the lens chamber. In at least some embodiments, fluid flow in this manner could create a concave lens such as that shown in FIG. 4.

A principle of operation of the present embodiment of the pumping system 70 relates to pressure recovery features of the nozzle inlet and diffuser outlet in relation to the pump cavity on the opposite side of the membrane of the actuator 72 relative to the vibrational component of the actuator. Equation (1) illustrates the effect of cross-sectional area, A(z), on pressure profile along a direction of flow, p(z):

$$p(z) = \frac{\rho}{2} u_0^2 \left[ 1 - \left( \frac{A_0}{A(z)} \right)^2 \right] \quad (1)$$

where $\rho$ is the fluid density and u is the velocity. A negative value of p(z), obtained when $A(z) < A_o$, represents a flow against the pressure such that the pump actuator has to provide extra energy besides dissipation energy (due to friction) to maintain the flow. Conversely, a positive value of p(z) represents a flow along the path of decreasing pressure without drawing energy from the pump actuator except the dissipation energy.

Using Equation (1), it is possible to obtain further relations between the average flow velocity and the pressure difference between two ends of the diffuser (and nozzle), as follows:

$$\Delta P_{diffuser} = \varepsilon_{diffuser} \cdot \frac{1}{2} \rho \overline{u}_{diffuser}^2 \quad (2)$$

$$\Delta P_{nozzle} = \varepsilon_{nozzle} \cdot \frac{1}{2} \rho \overline{u}_{nozzle}^2$$

where $\varepsilon$ is the pressure loss coefficient, $\rho$ is the fluid density and u denotes the mean velocity at the diffuser or nozzle neck. Due to the difference in the flow resistances in the diffuser and nozzle directions, pumping action by an actuator such as the actuator 72 positioned between the nozzle and diffuser results in a net transport of fluid from the inlet side of the pump cavity (e.g., the side coupled to the diffuser) to the outlet side (e.g., the side coupled to the nozzle).

It should be mentioned that Equation (2) is obtained presuming that there exists no pressure difference between the two chambers between which the pumping system 70 is coupled (e.g., no pressure difference between the fluid reservoir and lens cavity). Although this condition is often not met in practice when operating tunable lens systems in accordance with embodiments of the present invention, the underlying principle for optimization of the diffuser and nozzle design is the same, and it is convenient to determine design parameters and criteria in this manner.

In order to achieve the best pump performance, each diffuser and nozzle component is preferably designed for the highest possible flow directing capability. The diffuser dimensions have been shown in the literature experimentally and theoretically to be optimized at a cone expansion angle of 2Θ~5° in order to minimize fluidic losses. Additionally, diffuser efficiency, $\varepsilon$, is increased when the pump chamber entrance is rounded, and the outlet is sharp, as shown in Equation (3):

$$\eta = \frac{\varepsilon_{nozzle}}{\varepsilon_{diffuser}} \quad (3)$$

Further, at the resonance frequency of the actuator, the cavity volume variation due to the oscillating membrane/diaphragm can be expressed as shown in Equation (4):

$$V_c = V_0 \sin 2\pi f t \text{ where } V_0 = K_v x_0 \quad (4)$$

where $V_0$ is the volume variation amplitude; $K_v$ is a material constant; $x_0$ is the membrane/diaphragm center deflection amplitude; f is the pump excitation frequency; and t is time.

Assuming that the pressure loss coefficients are constant and integrating over a complete pump cycle, an approximate expression for the net volume transport for a single pump chamber with one membrane/diaphragm can be obtained at zero pump pressure across the pump as shown in Equation (5):

$$\Phi = \frac{K_v x_0 \omega}{\pi} \left( \frac{\eta^{1/2} - 1}{\eta^{1/2} + 1} \right) \quad (5)$$

where $$\eta = \frac{\varepsilon_{nozzle}}{\varepsilon_{diffuser}},$$

i.e., the ratio of the pressure loss coefficients of the nozzle and the diffuser. This equation shows that the pump flow is maximized if η is maximized.

An approximate value of the resonance frequency of the oscillation of the membrane/diaphragm can be calculated using a mass-spring analogy where the elastic properties of the membrane/diaphragm represents the spring and the oscillating fluid in the diffuser/nozzle components represents the mass. Assuming a conservative system, the energy will oscillate between the maximum potential energy of the membrane/diaphragm and the maximum kinetic energy of the fluid. Equation (6) shows the resulting resonance frequency $f_o$ for a pumping system having a single pump chamber and flat-walled (as opposed to purely-conical) diffuser/nozzle components to be:

$$f_o = \frac{1}{2\pi} \left[ \frac{K_p(1 + \eta^{1/2})^2 b(D-d)}{\rho K_v (1+\eta) L \frac{D}{d}} \right] \quad (6)$$

where $K_p$ is a constant; b is the depth; L is the length of the nozzle or diffuser, d is the width of the nozzle/diffuser at its narrower end, and D is the width of the nozzle/diffuser at its wider end.

High resonant frequency is desirable in order to achieve a high-volume flow, as shown in the following Equation (7) for pump flow rate, $\phi$:

$$\phi = \frac{V_o \omega_o}{\pi} \left( \frac{\sqrt{\eta} - 1}{\sqrt{\eta} + 1} \right) \quad (7)$$

where $V_0$ is the actuator's membrane/diaphragm volume displacement, $\omega_0$ is the resonant frequency and $\eta$ is the fluid directivity efficiency. Increasing the Young's modulus of a substrate on which the pumping system (and also possibly the fluidic lens and/or fluid reservoir) is mounted, as shown in FIGS. 10-12, results in higher resonant frequency, and therefore higher pump flow rate.

Figure 8:
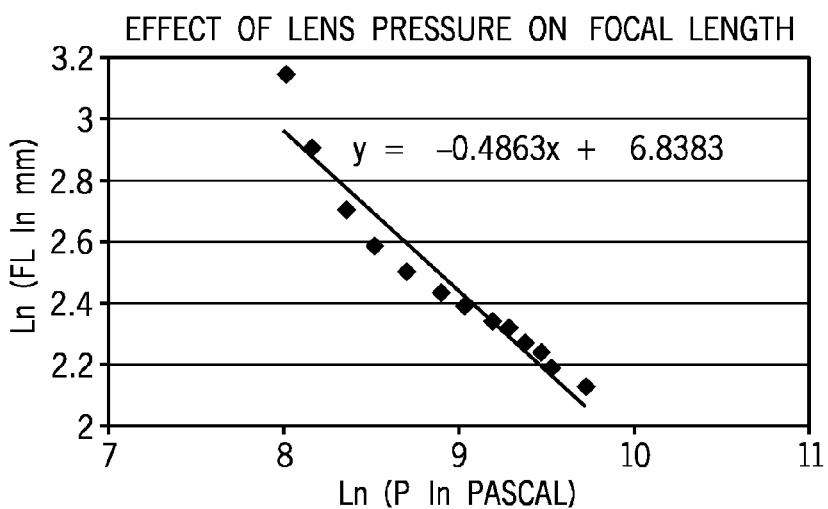
FIGS. 8 and 9 are graphs showing, respectively, exemplary effects of lens pressure upon the focal length and numerical aperture of a fluidic adaptive lens in accordance with one embodiment of the present invention.
Figure 9:
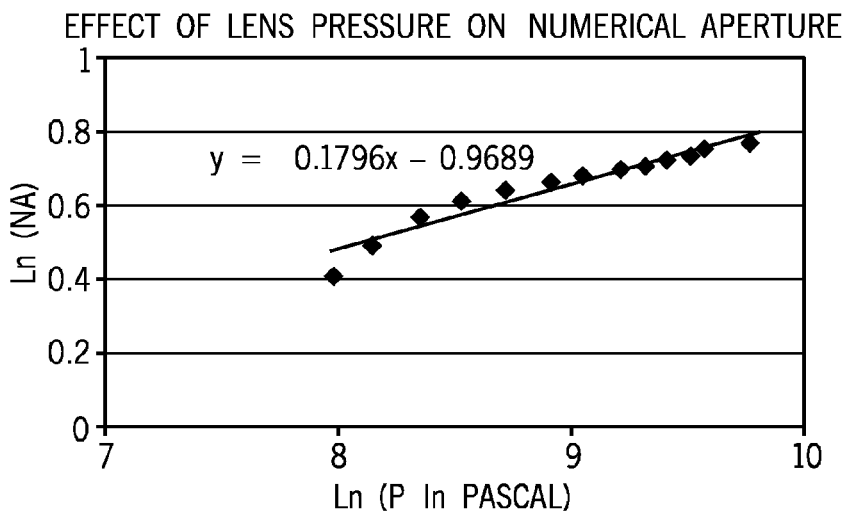

Depending upon the embodiments and the particular design, a variety of different pump flow rates can be achieved with different pumping systems. FIG. 7 shows the flow rates achieved by one exemplary micropump designed in accordance with one embodiment of the present invention, where a piezoelectric vibrational component is employed in the actuator. Also, as discussed above, fluidic flow from the pumping system into or out of a lens chamber (e.g., such as the lens cavities 33, 43 of FIGS. 3 and 4) changes the pressure within the lens chamber and results in the deformation of the lens membrane, so as to change the lens focal length and numerical aperture. FIGS. 8 and 9 respectively show the effects of pressure difference generated by an exemplary micropump upon the focal length and numerical aperture of an exemplary fluidic lens, respectively.

Turning to FIGS. 10-12, in at least some embodiments of the present invention, the overall tunable lens system is integrated completely (or almost completely) on a single microchip or similar structure. The lens system includes a first cavity or chamber that is a lens cavity (e.g., such as the cavities 33, 43 discussed with reference to FIGS. 3 and 4) and a second cavity or chamber that is a reservoir or fluid source chamber, and further includes a pumping system coupling those two cavities/chambers. The pumping systems of FIGS. 10-12 take the form of the pumping system 70 of FIG. 6, and each employs an actuator, a diffuser and a nozzle. Both cavities/chambers are capped with elastic membranes, bending in opposite senses when a pressure difference exists between them. The curvature of the lens cavity, which is defined in part by its elastic membrane together with other parameters such as the index of refraction of the fluid, determines the focal distance of the lens, while the curvature of the reservoir is not of particular concern unless its role changes (e.g. in some embodiments it is conceivable that the reservoir could serve as an additional lens). For simplicity and generality, the diffuser and nozzle can also be collectively referred to as "flow directing channel segments".

Figure 10A:
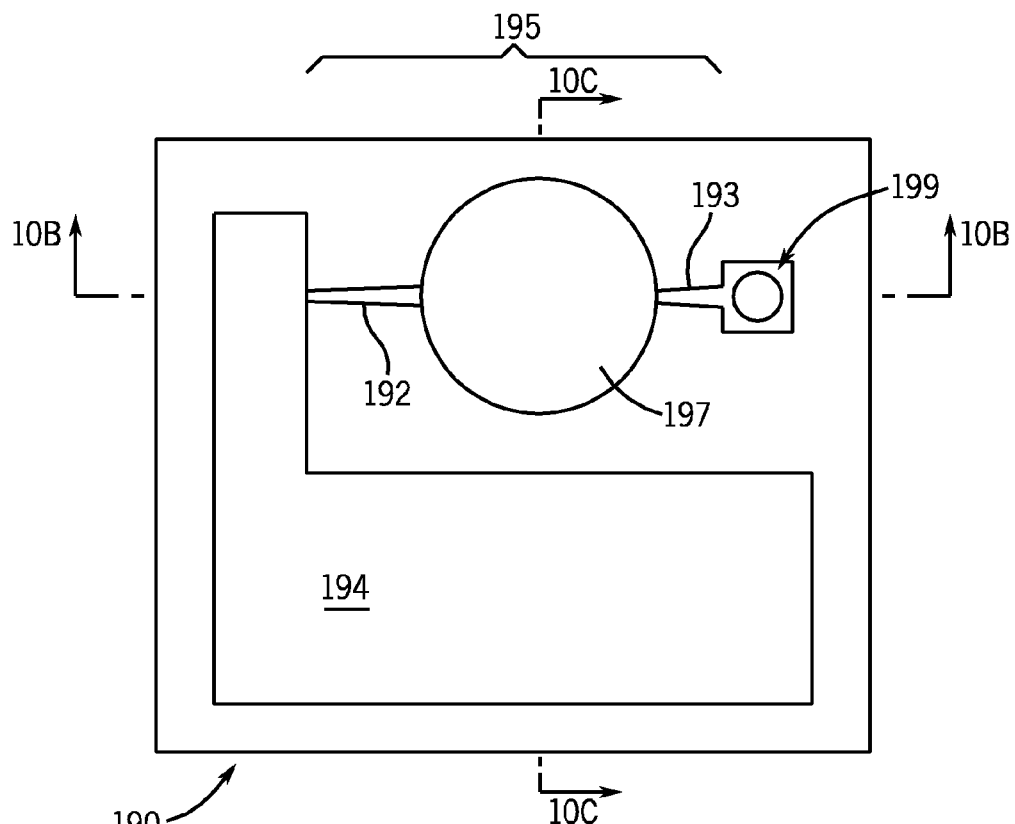
FIGS. 10A-10C, 11A-11C and 12A-12C show top plan and cross-sectional views of exemplary tunable lens systems employing a pumping system having a nozzle, diffuser and actuator, in accordance with at least some embodiments of the present invention.
Figure 10B:
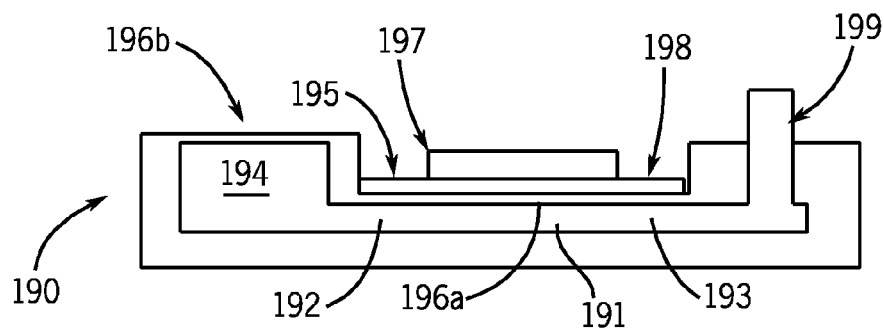
Figure 10C:
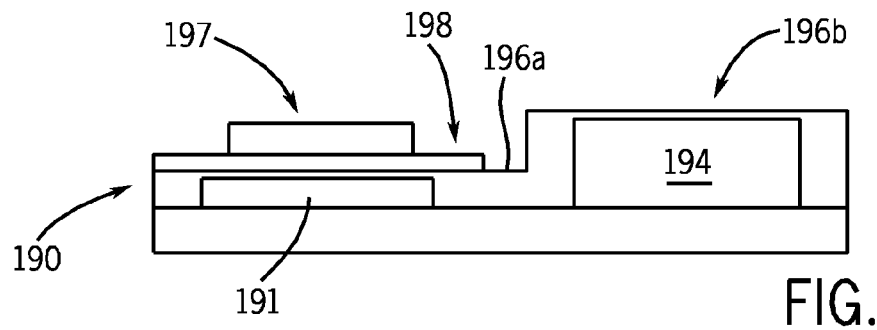
Figure 11A:
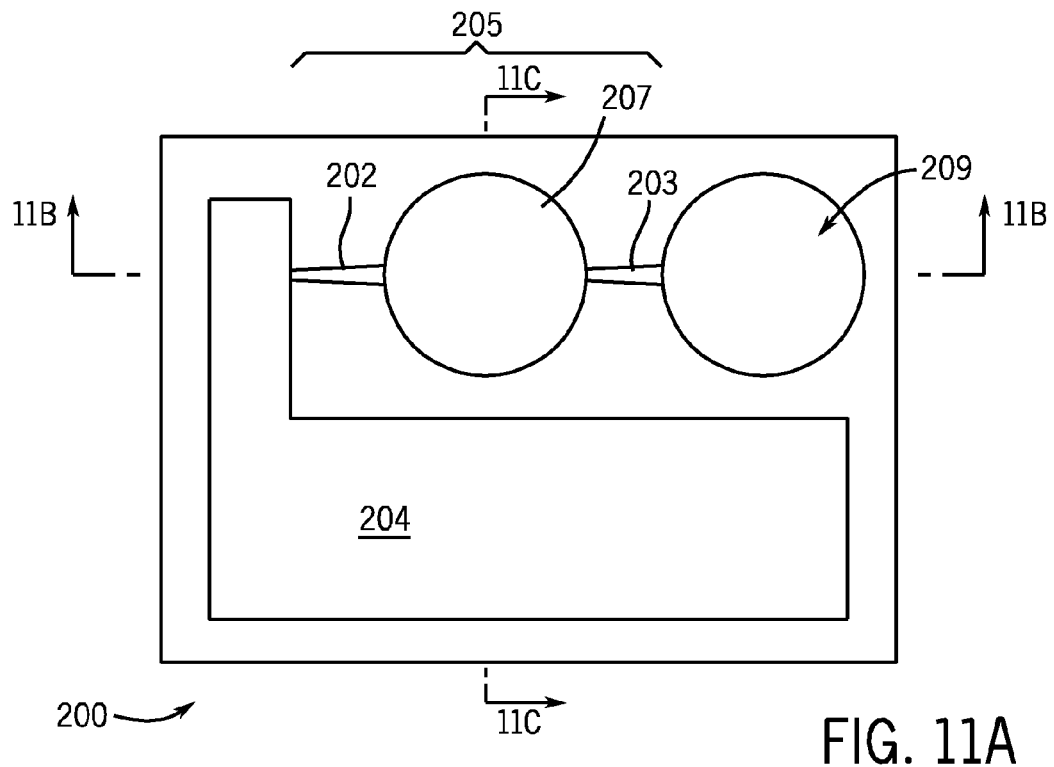
Figure 11B:
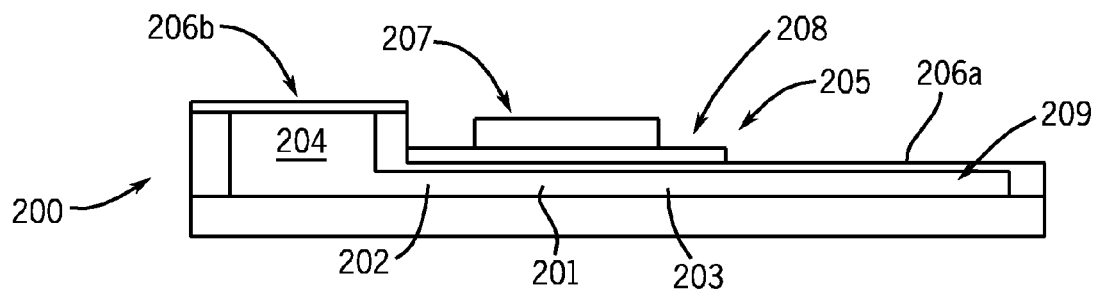
Figure 11C:
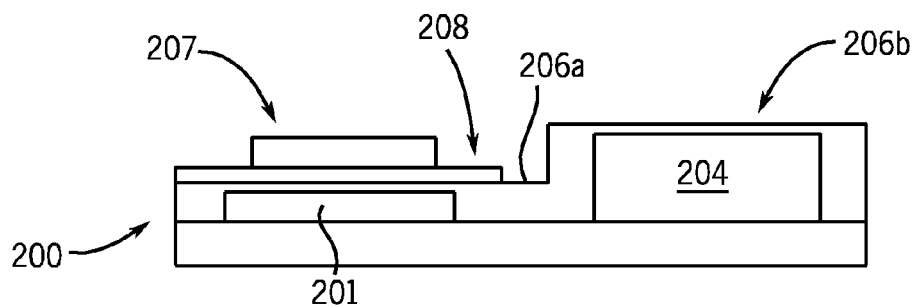
Figure 12A:
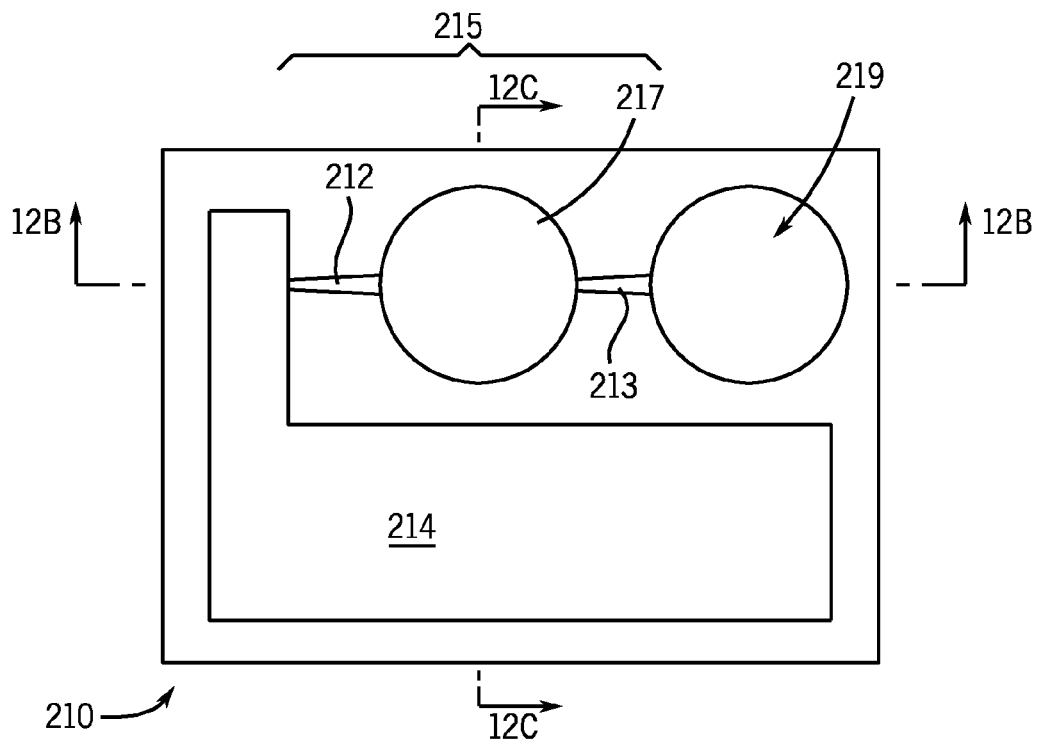
Figure 12B:
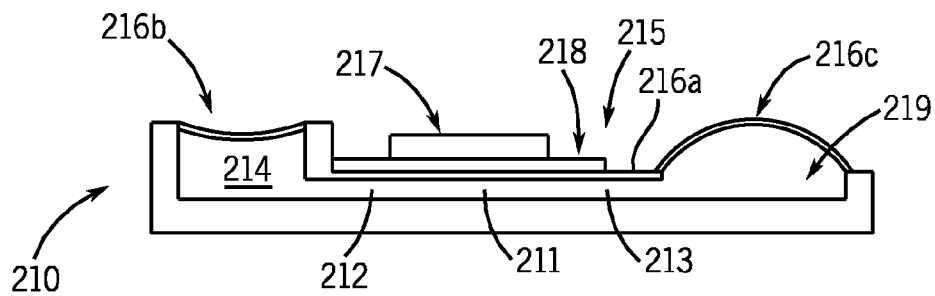

More specifically, FIGS. 10A, 11A and 12A show first, second and third exemplary "on-chip" tunable lens systems 190, 200, and 210, respectively, in schematic form. FIGS. 10B, 11B and 12B respectively show cross-sections of the lens systems 190, 200 and 210 taken along respective lines B-B of FIGS. 10A, 11A and 12A, respectively, while FIGS. 10C, 11C and 12C respectively show cross-sections of the lens systems 190, 200 and 210 taken along respective lines C-C of FIGS. 10A, 11A and 12A, respectively. As shown, each of the respective lens systems 190, 200 and 210 includes a respective pumping system 195, 205 and 215, respectively, which is coupled between a respective integrated reservoir 194, 204 and 214, respectively, and a respective lens cavity or corresponding structure 199, 209 and 219, respectively (as will be described in further detail, the system 190 of FIG. 10A only shows a port/channel that can be coupled to a lens cavity).

Further as shown, each of the respective pumping systems 195, 205 and 215 includes a respective vibrational component 197, 207 and 217, situated atop (or on one side of) a respective pair of flexible membranes (or diaphragms or interconnects) 198, 208 and 218, respectively, and 196a, 206a and 216a, respectively. Below (or on the other side of) each respective pair of flexible membranes is additionally located a respective pump cavity or chamber 191, 201 and 211, respectively. The respective vibrational components, flexible membranes, and pump cavities of each of the respective pumping systems 195, 205 and 215 together form respective actuators of the respective pumping systems. Although in the present embodiments of FIGS. 10-12 there are two flexible membranes between each of the vibrational components and the pump cavities, in alternate embodiments only one flexible membrane/diaphragm/interconnect need be present.

Additionally as shown, each of the respective pumping systems 195, 205 and 215 includes a respective pair of flow directing channel segments that include a respective diffuser 192, 202 and 212, respectively, and a respective nozzle 193, 203 and 213, respectively. Due to the operation of the respective pumping systems 195, 205 and 215, fluid media within the respective reservoirs 194, 204, and 214 are communicated through the respective diffusers 192, 202 and 212, through the respective pump cavities 191, 201 and 211, and out through the respective nozzles 193, 203 and 213, into the respective lens cavities or corresponding structures 199, 209 and 219. More specifically, vibrational forces created by the respective vibrational components 197, 207 and 217 of the respective pumping systems 195, 205 and 215 are translated by the respective flexible membranes 198, 208 and 218 and 196a, 206a and 216a to the respective pump cavities 191, 201 and 211. Those forces, combined with the pressure differences resulting from the operation of the respective diffusers 192, 202 and 212 and nozzles 193, 203 and 213, result in the communication of the respective fluid media from the respective reservoirs 194, 204 and 214 through the respective pumping systems 195, 205 and 215 into the respective lens cavities or corresponding structures 199, 209 and 219.

As shown, the tunable lens systems 200, 210 of FIGS. 11 and 12 include lens cavities 209 and 219 that are integrated within the same microfluidic chip as the pumping systems 205, 215 and the reservoirs 204, 214. Atop (or on one side of) the respective lens cavities 209, 219 are respective flexible membranes 206a and 216c, respectively. In the case of the lens system 200, the flexible membrane 206a covering the lens cavity 209 is the same membrane discussed above in connection with the pumping system 205 (the same membrane extends to cover both the lens cavity 209 and the pump cavity 201). The fluidic media translated between the reservoirs 204, 214 and lens cavities 209, 219 communicate fluidic pressures (and pressure changes/differences) to the integrated lens units and in particular to the integrated lens cavities 209 and 219.

Figure 12C:
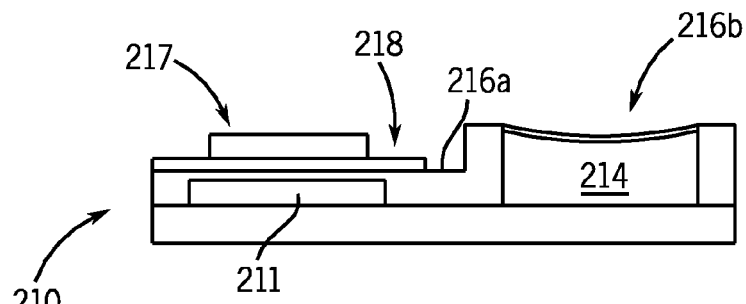

Assuming sufficient fluidic pressures are provided to the respective lens cavities 209, 219, the respective flexible membranes 206a and 216c expand outward as shown in FIG. 12B (but not in FIG. 11B, where the pressure being applied is insufficient to cause expansion of the membrane). To compensate for the outward expansion of the respective membranes 206a and 216c atop the respective cavities 209 and 219, additional flexible membranes 206b and 216b, respectively, atop the reservoirs 204 and 214, respectively, contract inward as shown in FIGS. 12B-12C (but not in FIGS. 11B-11C).

Additionally, while FIGS. 11 and 12 show the tunable lens systems 200 and 210 as having the respective lens cavities 209 and 219, respectively, FIG. 10 instead shows merely a corresponding structure that is a port 199. The port 199 is capable of being connected to a separate (e.g., off-chip) lens unit (not shown), which can take the form of one of the lenses shown in FIGS. 3-4, for example. The pumping system 195 causes the fluidic medium to flow from the reservoir 194 to the port 199, and then further to a lens cavity (not shown), by way of a connecting device that can take any of a variety of forms including, for example, a complementary port, a hose, or another type of channel. As with respect to the lens systems 200 and 210, the lens system 190 includes a flexible membrane 196b that covers the reservoir 194, albeit (since the lens is not on the chip) there is no membrane corresponding to the membrane 216c of FIG. 12B.

Notwithstanding the differences between the embodiments of FIGS. 10-12, each of these embodiments is a "closed system" where the total volume of the fluid in the lens and reservoir cavities plus the fluid existing within the pumping system (e.g., within the nozzle, diffuser and pump cavity) remains constant. Thus, the pumping systems are different from at least some conventional pumps insofar as the pumping systems are not operated to provide a continuous amount of flow of fluid from the reservoir cavity to the lens cavity (or vice-versa). Rather, the pumping systems merely tend to provide a one-time, temporary or repeated/periodic forcing of fluid from the reservoir cavity toward the lens cavity, so as to maintain a desired pressure differential between the two cavities and/or maintain a desired pressure within the lens cavity. Except when the state (e.g., the focal distance) of the lens changes, there will be no flow between the lens chamber and the reservoir.

It should further be mentioned that, while in each of the embodiments of FIGS. 10-12 the pumping systems 195, 205 and 215 (and particularly the diffusers and nozzles of the pumping systems) are oriented relative to the reservoir and lens cavities in such a manner as to tend to pump fluid from the reservoir cavity toward the lens cavity rather than vice-versa, in alternate embodiments the pumping systems (and their associate diffusers/nozzles) could be oriented in the opposite direction so as to tend to pump fluid from the lens cavity toward the reservoir cavity. Thus, while the tunable lens systems 190, 200 and 210 are configured so as to create convex-type lenses, in such alternate embodiments the lens systems could likewise be configured to create concave-type lenses. Further, depending upon the embodiment, a variety of different configurations employing a variety of different diffuser and/or nozzle-type flow directing channel segments could be employed. In some cases, only one of these components might be employed (e.g., where one of the channels coupling the pump cavity to the lens cavity or to the reservoir cavity was a constant-radius channel rather than a nozzle or diffuser).

In at least some embodiments, the pumping systems are micropumps, where the actuators of the pumping systems are piezoelectric actuators that include one or more piezoelectric vibrational components in combination with the membranes and pump cavities. Such a pumping system, formed by a piezoelectric actuator along with diffuser-type and nozzle-type flow directing channel segments, can be implemented in a manner allowing for control over and maintenance of a given pressure within the lens cavity/chamber, so as to achieve and maintain a desired curvature of the lens membrane and lens cavity/chamber. To tune the lens properly, it is possible to change either the frequency or the magnitude of the applied voltage to the piezoelectric actuator (or multiple piezoelectric actuators) to achieve a new or desired pressure difference between the lens cavity and reservoir cavity. High energy efficiency and precision control of voltage and/or frequency makes it possible to achieve high levels of stability and controllability for lens properties without the need for valves (although, in at least some alternate embodiments, valves can be added). In alternate embodiments, other types of actuators rather than piezoelectric actuators can be employed within the pumping systems.

The above-described embodiments of tunable lens systems involve a combination of concepts relating to both fluidic and optical systems, and benefit from the combination or interplay of concepts relating to both optical systems and (low-to-intermediate viscosity) fluidic systems. These embodiments of tunable lens systems, particularly those that avoid the use of any valves, provide significant advantages in comparison with certain other types of tunable lens systems that might employ valves and other types of pumps (e.g., peristaltic, rotary, or injection) with large volumetric strokes. In particular, the above-described embodiments of tunable lens systems provide improved performance (e.g., in terms of lens controllability and stability), are more easily and inexpensively manufactured, and are smaller in size, than other types of tunable lens systems that might employ valves and other types of pumps.

For example, in contrast with conventional pump designs that require large distance (10 μm or larger) motions of actuators, the present embodiments involving vibrational components can in at least some embodiments rely upon extremely small motions, on the order of 10 nm, of the actuators to develop fluidic pressure differences. The small deformations of the vibrational components (e.g., piezoelectric vibrational components) occur at sufficiently high frequencies (typically 1 to tens of KHz) such that the total fluidic displacement with time is large and results in relatively large fluid flow rates to quickly establish required pressures in the lens chambers for desired focal distances. As a result of small deformations occurring at high frequencies, these embodiments are able to achieve highly sensitive tuning through the magnitude and/or frequency of the applied voltage and fast response. Further, these embodiments of pumping systems are capable of achieving comparable flow rates to those achieved with the conventional pumping systems.

Figure 13A:
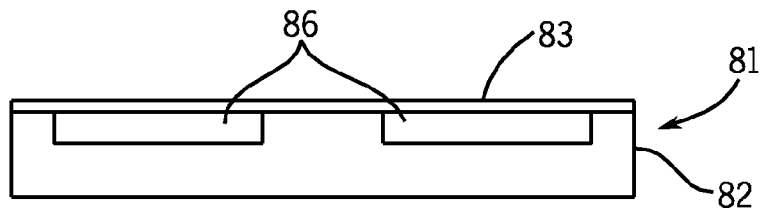
FIGS. 13A-13C illustrate exemplary steps of forming tunable lens systems such as those described with reference to FIGS. 10A-12C.
Figure 13B:
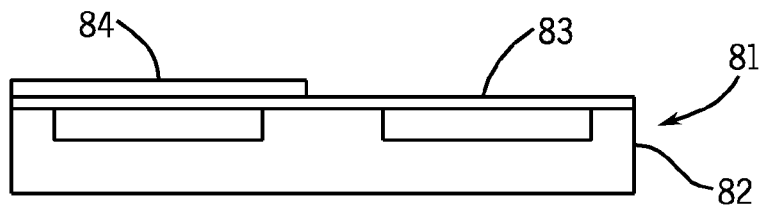
Figure 13C:
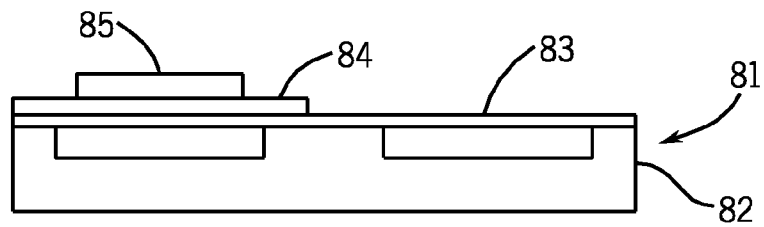

Turning to FIGS. 13A-13C and 14A-14F, an exemplary fabrication method of micropump actuators having vibrational components integrated with fluidic cavities (or channels) with deformable membranes is shown. In particular, FIGS. 13A-C show how a vibrational component 85 (corresponding to the vibrational components 197, 207 and 217 of the actuators shown in FIGS. 10-12) can be assembled onto the combination of a generic lens system structure 81 and a flexible membrane (or diaphragm or interconnect) 84 to form an overall actuator that can be employed in a pumping system such as the pumping systems 195, 205 and 215 discussed above. As shown in FIG. 13A, the generic lens system structure 81 is formed from a wafer (e.g., a rigid, typically transparent substrate) 82 and a flexible membrane 83, with the wafer and membrane cooperating to form one or more (in this example, two) internal cavities 86. The internal cavities 86 can be used to form any of a lens cavity (such as the lens cavities 209 and 219 discussed above) a reservoir cavity (such as the reservoir cavities 194, 204 and 214 discussed above), and a pump cavity (such as the pump cavities 191, 201 and 211 discussed above), and also in at least some embodiments can be used to form diffuser or nozzle-type components as well. It will be understood that the flexible membrane 83 can serve as the one or more of the membranes 196a, 196b, 206a, 206b, 216a, 216b and 216c discussed above with respect to FIGS. 10-12.

Once the generic lens system structure 81 is formed, the flexible membrane/diaphragm/interconnect 84 can be positioned onto and secured to the flexible membrane 83 as shown in FIG. 13B. The flexible membrane 84 corresponds to the flexible membranes 198, 208 and 218 shown in FIGS. 10-12 and is typically positioned directly over (or otherwise is aligned with) one of the cavities 86 that is intended to be a pump cavity such as the pump cavities 191, 201 and 211 of FIGS. 10-12. Subsequently, as shown in FIG. 13C, a vibrational component 85 corresponding to the vibrational components 197, 207 and 217 of FIGS. 10-12 is positioned onto and secured to the flexible membrane 84. Thus, the flexible membrane 84 is sandwiched between the vibrational component 85 and the flexible membrane 83, which in turn is sandwiched between the flexible membrane 84 and one of the cavities 86.

It should be noted that FIGS. 13A-C only provide exemplary cross-sectional views of the formation of an exemplary structure that can be employed as a tunable lens system (or part of a tunable lens system), where the cross-sectional views in particular correspond to the cross-sectional views shown in FIGS. 10C, 11C and 12C. Thus, although the cavities 86 formed by the wafer 82 and membrane 83 shown in FIGS. 13A-C appear to be sealed, it is to be understood that the formation of those cavities and the tunable lens system generally includes the formation of diffuser components, nozzle components or other channel(s) allowing for fluid inflow and outflow between or among the different cavities, such as might be visible from different cross-sectional views (e.g., views corresponding to those shown in FIGS. 10B, 11B and 12B).

Figure 14A:
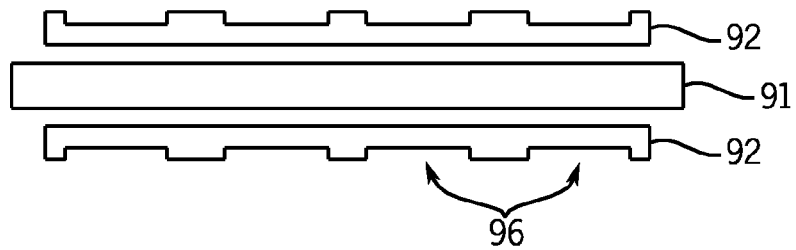
FIGS. 14A-14F illustrate further exemplary steps of forming tunable lens systems similar to those described with reference to FIGS. 10A-12C.
Figure 14B:
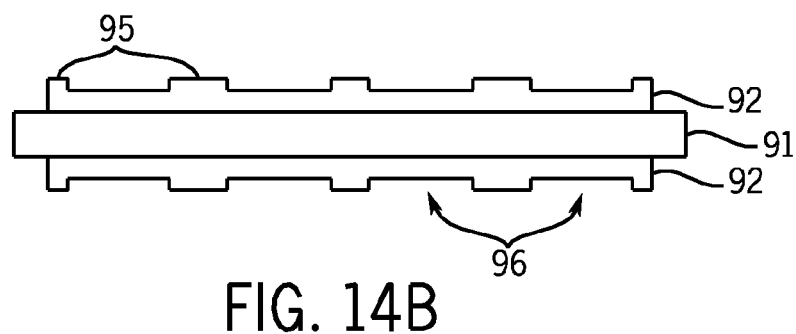
Figure 14C:
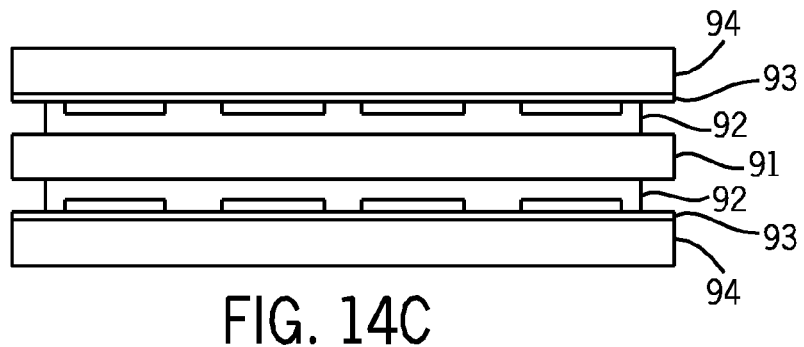

Turning to FIGS. 14A-14F, the present invention also encompasses the formation of more complicated tunable lens systems. FIGS. 14A-14C in particular show how more complicated multi-lens structures can be formed. As shown in FIG. 14A, the formation of a multi-lens structure first involves the fabrication/providing/choosing of a transparent substrate (e.g., a glass substrate or polymer substrate) 91 of proper thickness (typically 0.1 mm to a few millimeters), as well as two wafers 92 patterned with multiple open-sided cavities 96. The wafers 92 can, but need not be, of the same type as the wafers 82 discussed with reference to FIGS. 13A-13C. The patterns defining the cavities 96 can be formed using a soft lithography or molding process. Then, as shown in FIG. 14B, the two wafers 92 are bonded to opposing sides of the substrate 91 in a manner such that the cavities 96 are open outward away from the substrate.

Subsequently, as shown in FIG. 14C, two handle wafers 94 are provided, where each handle wafer has deposited along a side thereof a respective membrane 93 (which can, but need not, be of the same type as the membrane 83 of FIGS. 13A-13C). The handle wafers 94 provide mechanical support for bonding the membranes 93 onto outer surfaces or rims 95 of the wafers 92, where the rims 95 help to define the open-sided cavities 96. Once the membranes 93 are in contact with and affixed to the rims 95, the open-sided cavities 96 become fully-closed cavities, with the possible exception of certain channels that extend between or among the various cavities (e.g., channels corresponding to the nozzle or diffuser components discussed above) or extend outward from the multi-lens structure to the outside environment. Once the handle wafers 94 are removed from the membranes 93, a complete multi-lens structure is formed.

While the multi-lens structure formed in FIGS. 14A-14C has multiple sections (e.g., cavities) that can each be used as a fluidic adaptive lens, these sections can also be employed as reservoirs and pump cavities as discussed above with reference to FIGS. 10-12. For example, referring further to FIGS. 14D-14F, the multi-lens structure of FIG. 14C is further modified to include four of the membranes 84 and four of the vibrational components 85 described with respect to FIG. 13C. As in the case of FIG. 13C, the membranes 84 are respectively sandwiched between the respective vibrational components 85 and the respective membranes (in this case, membranes 93) that help to define the respective cavities 96. The resulting tunable lens system 80 of FIG. 14D thus includes the combination of four lens units (or reservoirs) and four actuators.

Figure 14D:
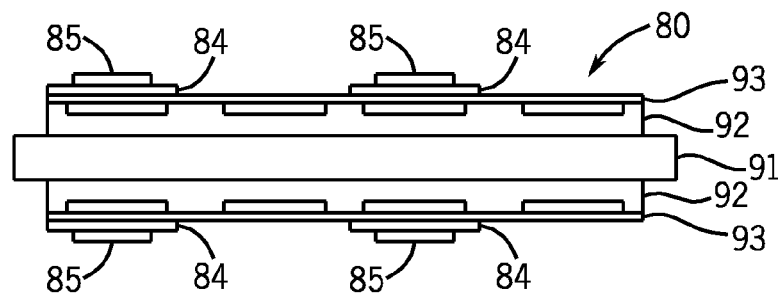
Figure 14E:
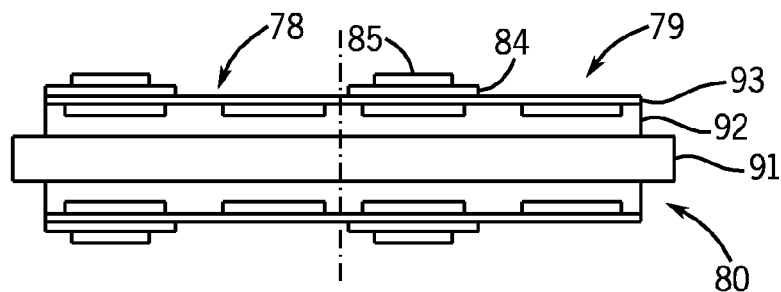
Figure 14F:
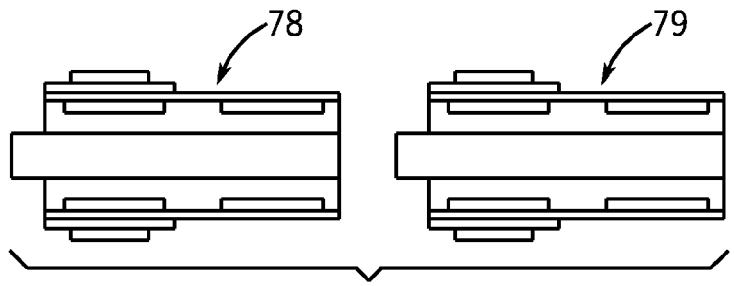

Subsequently, as shown in FIGS. 14E and 14F, in at least some embodiments, it is also possible to divide up the tunable lens system 80 shown in FIG. 14D into multiple smaller tunable lens systems. For example, as shown in FIG. 14F, the tunable lens system 80 of FIG. 14D can be divided into two individual tunable lens systems 78, 79, each of which has only two lens units (or reservoirs) and two actuators. As exemplified by FIGS. 14E and 14F, therefore, where multiple tunable lens systems are created simultaneously on a single wafer (or combination of wafers and/or other components such as the substrate 91) by way of a batch process, such multiple tunable lens systems can be separated from one another by dicing the wafer (and/or substrate) into the smaller, individual tunable lens systems. Once tunable lens systems of desired sizes and other characteristics are obtained they can be employed in optical zoom systems or a variety of other systems as described in further detail below. Additional information concerning the formation of multi-lens structures (e.g., particularly pertaining to FIGS. 14A-14C) is provided in the aforementioned other U.S. provisional and PCT patent applications incorporated by reference herein.

Of significance during the process shown in FIGS. 14A-14C is that there be appropriately high-precision positioning of the cavities 96 used to form the lens bodies. In the embodiment of FIGS. 14A-14C, the multi-lens structure employs pairs of cavities 96 that are on opposite sides of the substrate 91, which can potentially be utilized as multi-lens devices (e.g., light passing through one of a given pair of lenses on one side of the substrate 91 also passes through the other of that pair of lenses on the other side of the substrate 91). Consequently, good alignment of the corresponding cavities on opposite sides of the substrate is of particular interest.

Because all of the materials (including the substrate 91 and wafers 92) are transparent, and because the wafers 92 on which the patterned cavities 96 are formed are large, one can use either a contact aligner or the standard fixture of bonding machines (e.g., bonding machines produced by Karl Suss) to routinely achieve an alignment accuracy of a few micrometers. Assuming that the cavities 96 (and the wafers 92 defining those cavities) are properly aligned, the lens membranes 93 deposited via the silicon handle wafers 94 can be bonded to the rims 95 with less alignment concern. The processes described with respect to FIGS. 14A-14F allow for the fabrication of tunable lens systems having lenses of nearly any size (e.g., from <0.1 mm in diameter to centimeters in diameter) for various applications.

Turning to FIGS. 15-17, additional exemplary "on-chip" tunable lens systems are shown in schematic form. Although similar in some respects to the tunable lens systems of FIGS. 10-12, the tunable lens systems of FIGS. 15-17 each employ multiple integrated pumping systems rather than merely a single pumping system. Incorporation of additional pumping systems as shown in FIGS. 15-17 greatly increases the pumping efficiency of the lens systems, and also directly increases fluid flow rate and increases the volume of fluidic medium in communication between the reservoir cavity and lens cavity of each tunable lens system due to the additional pump cavity volume associated with each pump system. Further as a result, response times (e.g., tuning time) of the tunable lens systems can be increased (e.g., shortened) relative to what those times would be if only a single pumping system was employed. Thus, the response times for lens deformation and lens focal length tuning are enhanced.

At the same time, the incorporation of additional pumping systems also increases the total area of the microfluidic chip, and may reduce the size benefit of having an integrated pumping system, lens, and/or reservoir. Thus, whether a given system design should employ multiple pumping systems will depend largely upon particular application requirements. For example, the systems shown in FIGS. 15-17 are particularly appropriate for use in higher performance optical systems where size considerations are potentially of less relative importance.

Figure 15A:
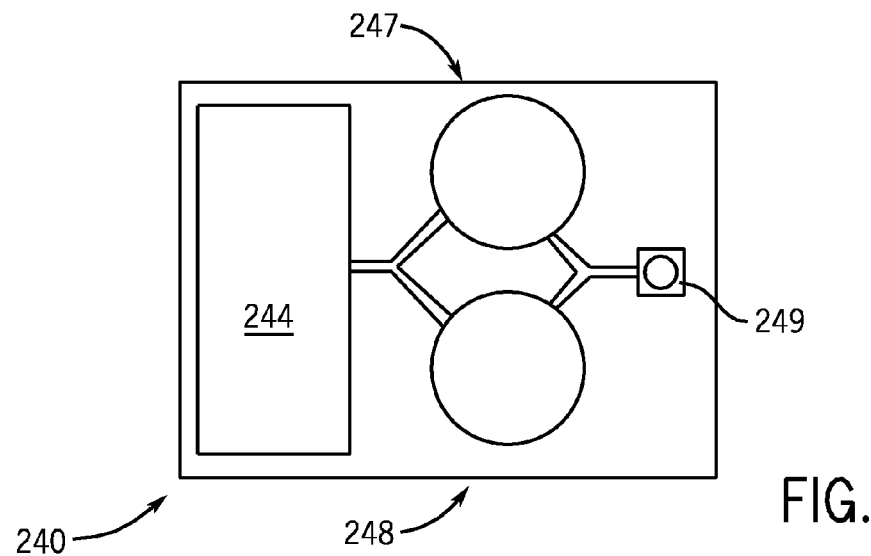

More particularly, FIG. 15A shows in schematic form a top plan view of an exemplary integrated tunable lens system 240 having an integrated reservoir 244 and a pair of integrated asymmetric dual pumping systems 247 and 248, respectively, for use with a separate lens unit (not shown) to be attached at a port 249. As shown, each of the dual pumping systems 247, 248 includes a respective nozzle, diffuser and vibrational component, and it will be understood (as described with respect to the tunable lens systems of FIGS. 10-12) that each vibrational component is coupled to a membrane (or membranes), on the opposite side of which is located a corresponding pump cavity that is coupled to each of the nozzle and diffuser. Each of the dual pumping systems 247 and 248 is asymmetric insofar as the diffuser of each of the pumping systems is larger than the nozzle of each of the pumping systems. Additional short channels are provided to couple the reservoir 244 and port 249 to the pairs of diffusers and nozzles of the pumping systems 247, 248, which are coupled in parallel with one another.

Figure 15B:
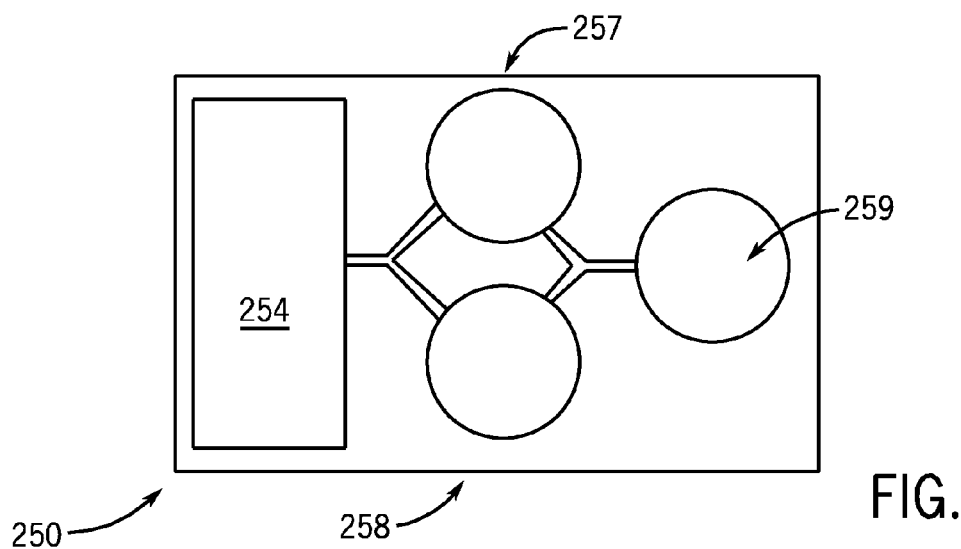
Figure 16A:
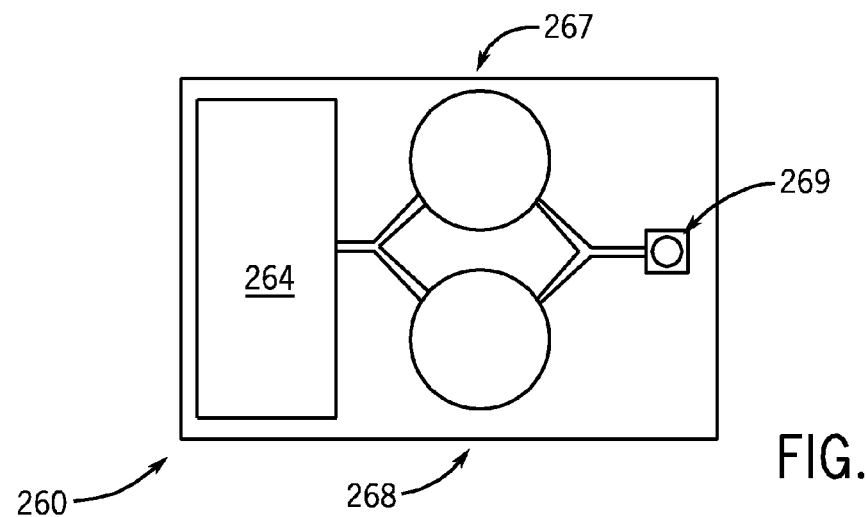

As for FIGS. 15B, 16A and 16B, each of these shows a modified version of the tunable lens system 240 of FIG. 15A. FIG. 15B in particular shows in schematic form a top plan view of an exemplary integrated tunable lens system 250 having an integrated reservoir 254 and integrated asymmetric dual pumping systems 257, 258, and additionally (in contrast to FIG. 15A) an integrated lens cavity 259. FIG. 16A shows in schematic form a top plan view of an exemplary integrated tunable lens system 260 having an integrated reservoir 264 and integrated symmetric dual pumping systems 267, 268 for use with a separate lens unit to be attached at a port 269. The pumping systems 267, 268 are symmetric insofar as both the nozzle and the diffuser of each respective pumping system are approximately the same size and shape. Additionally, FIG. 16B shows in schematic form a top plan view of an exemplary integrated tunable lens system 270 having an integrated reservoir 274, integrated symmetric dual pumping systems 277, 278 and an integrated lens unit 279.

With respect to FIGS. 17A and 17B, additional top plan views of two additional exemplary tunable lens systems 280 and 290 are shown in schematic form. FIG. 17A shows in particular an exemplary tunable lens system 280 having an integrated reservoir 284 and three integrated pumping systems 286, 287, and 288, respectively, all of which are connected between the reservoir and a port 289 to which can be coupled a separate lens unit (not shown). In the embodiment shown, each of the pumping systems 286-288 is symmetric insofar as the diffuser and nozzle of each of the pumping systems is of the same respective size and shape. FIG. 17B also shows an exemplary tunable lens system 290 having an integrated reservoir 294 and three integrated pumping systems 296, 297, and 298, which in this case are each coupled to an integrated lens unit 299. Again, in this example, the pumping systems 296-298 are symmetric in terms of their nozzles and diffusers.

Although FIGS. 17A-17B show symmetric embodiments, in alternate embodiments the pumping systems can be asymmetric pumping systems, and/or the different pumping systems can take different forms relative to one another (e.g., one pumping system could be symmetric while another was asymmetric). Further, while FIGS. 15A-15B, 16A-16B and 17A-17B each show either two or three pumping systems connected in parallel with one another between a reservoir and lens unit, the present invention is also intended to encompass tunable lens systems having any arbitrary number of pumping systems (e.g., more than three) coupled in parallel with one another, as well as further intended to encompass embodiments in which two or more pumping systems are coupled in series with one another.

In at least some embodiments, the use of more than one pumping system in a given tunable lens system as shown in FIGS. 15-17 makes it possible to achieve certain pumping behavior that is not possible in tunable lens systems employing only a single pumping system such as those described with respect to FIGS. 10-12. For example, the motion of the first and second actuators of the first and second pumping systems of each of the embodiments shown in FIGS. 15-16 can be controlled to operate in tandem. That is, the actuators of the pumping systems can be controlled such that when one of the actuators (e.g., the actuator associated with one of the pumping systems 247, 257, 267 and 277) is generating a positive pressure, the other of the actuators (e.g., the actuator associated with a corresponding one of the pumping systems 248, 258, 268 and 278) is generating a negative pressure (or no pressure), and vice-versa.

Coupled motion of the pairs of actuators in this tandem manner minimizes flow of the fluidic medium in the backward direction (e.g., in the present embodiments, from the lens unit back toward the reservoir), which increases total pump efficiency, decreases the response time of lens deformation, and therefore decreases lens focal length tuning time. Also, such operation minimizes pulsating flow of the fluidic medium within the tunable lens system. Further, while coupled or tandem (or alternating) motion in this manner is possible, it is not necessary that such motion be performed in all embodiments. A variety of other types of coordination (or lack thereof) in the operation of the various pumping systems of tunable lens systems having multiple pumping systems is possible. For example, with respect to the embodiment of FIG. 17A, the three pumping systems 286, 287 and 288 could be operated in a sequential manner where each pumping system was triggered to provide positive pumping pressure in succession, with the pumping system 286 then being triggered again as the pumping system 288 was finishing.

Figure 18:
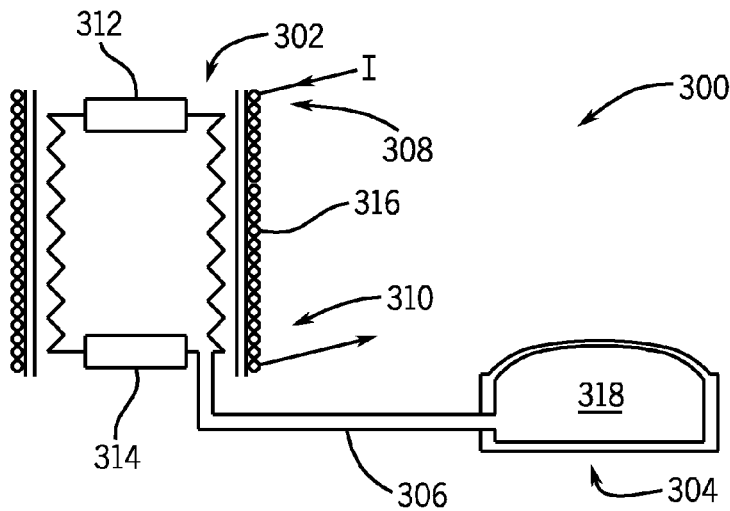
FIGS. 18, 19A and 19B show cross-sectional views of additional exemplary tunable lens systems employing pumping systems having a bellow reservoir and electromagnetic actuator, in accordance with at least some embodiments of the present invention.
Figure 19A:
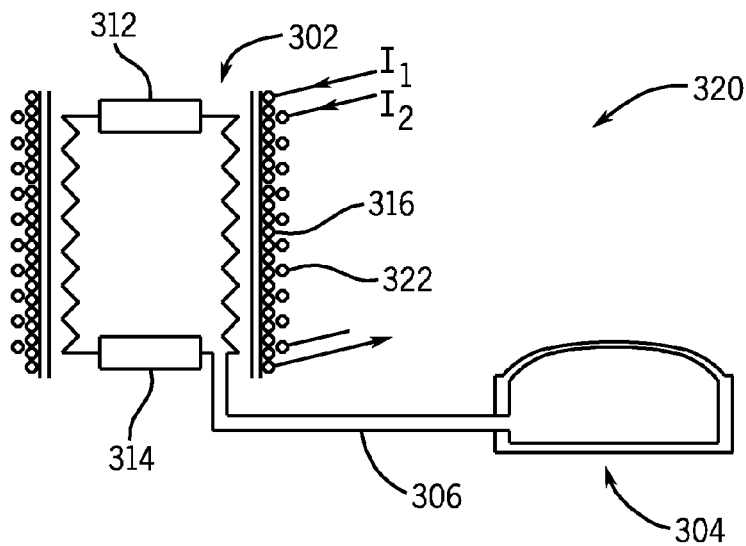
Figure 19B:
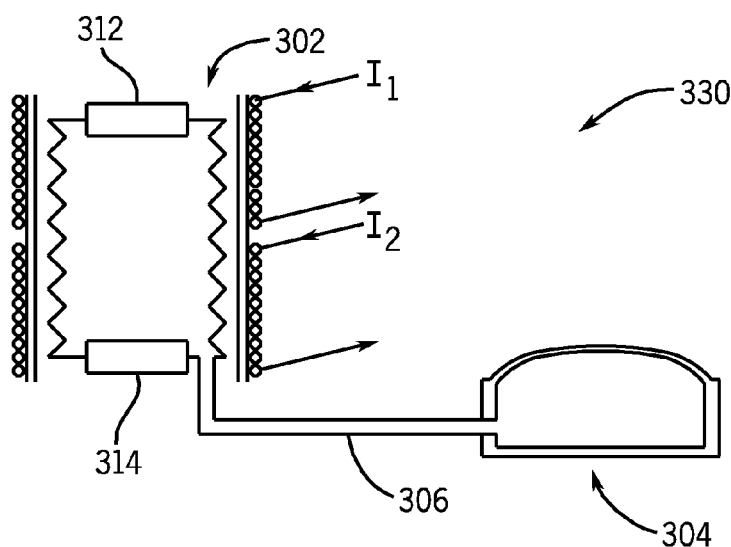

Turning to FIGS. 18, 19A and 19B, the present invention in at least some other embodiments relates to tunable lens systems that employ other types of pumping systems instead of, or in addition to, the above-described pumping systems utilizing nozzle(s) and/or diffuser(s) in combination with actuators formed from the combination of vibrational components, pump cavities and membranes between the vibrational components and the pump cavities. In particular, in at least some embodiments, the present invention encompasses tunable lens systems that employ reservoirs and actuators that directly control the volumes of the reservoirs by applying greater or lesser amounts of force or pressure to the reservoirs so as to compress or expand the reservoirs. The reservoirs are directly coupled by way of respective fluid channels to the respective lenses of the respective tunable lens systems. Simply by virtue of controlling the volumes of the reservoirs through operation of the actuators, the amount of fluidic pressure existing within the lens, and consequently the lens focus (and/or other parameters such as the lens magnification), can be adjusted.

FIG. 18 in particular shows a cross-sectional view of one exemplary embodiment of a tunable lens system 300 having a reservoir 302 that is controllable in terms of its volume, and that is coupled to a fluidic lens 304 (similar to the fluidic lenses 30, 40 of FIGS. 3 and 4) by way of a fluid channel 306. The reservoir 302 takes the form of a largely-cylindrical bellow so as to be compressible and expandable. At first and second ends 308 and 310, respectively, of the bellow reservoir 302 are first and second pieces of ferromagnetic material (e.g., iron) 312 and 314, respectively. Additionally, surrounding the bellow reservoir 302 (e.g., circumferentially surrounding and in this embodiment extending along at least a portion of the axial length of the cylindrical bellow) is a coil 316, which constitutes an electromagnetic actuator.

Depending upon what current (shown as I) is provided to the coil 316, a magnetic force created by the coil tends to bring the two pieces of ferromagnetic material 312, 314 together or to force them apart, so as to cause the bellow reservoir 302 to contract or expand, such that fluid is either pushed into a lens cavity 318 of the lens 304 (resulting in a shorter focal distance and a smaller F-number), or allowed to flow out of the cavity. A standby state of the tunable lens system is determined by the curvature of the lens membrane of the lens 304 without applied currents. In such state, the elasticity of the bellow reservoir 302 is in balance with the elasticity of the lens membrane, assuming the gravity effect of the fluid is negligible.

Reliable operation of the optical system typically requires a satisfactory degree of precision in terms of controlling fluidic volume within the bellow reservoir 302 (and thus fluidic volume within the lens cavity 318). In many cases, it is desirable that the amount of fluid in the lens cavity 318 be controllable to an accuracy of better than 1%. In order to attain this accuracy level, and assuming that the volume of the reservoir 302 is about the same as the volume of the lens cavity 318, the height of the reservoir has to be controllable to an accuracy of better than 1%. Given that the force or the travel distance of the bellow reservoir 302 is proportional to the square of the current, the applied current should be stabilized within 0.5% of a target value.

Although attainment of the above-described degrees of accuracy are possible with the single coil actuator of FIG. 18, greater degrees of accuracy and control can be more easily achieved with the embodiments of tunable lens systems shown in FIGS. 19A and 19B, which employ multiple coils. Specifically with respect to FIG. 19A, a tunable lens system 320 includes the same lens 304, fluid channel 306 and bellow reservoir 302 with pieces of ferromagnetic material 312, 314 as in FIG. 18. Additionally, the tunable lens system 320 also includes the coil 316 as in FIG. 18. However, in contrast to the tunable lens system 300 of FIG. 18, the tunable lens system of FIG. 19A further includes a second coil 322 that concentrically surrounds the first coil 316, such that the actuator of the tunable lens system 320 includes two coils rather than one.

The first and second coils 316, 322 of FIG. 19A are in the present embodiment electrically isolated from one another, and have respectively first and second independent currents $I_1$ and $I_2$ applied thereto. In at least some embodiments, the first coil 316 with current $I_1$ is controlled so as to provide the force to actuate the bellow reservoir 302, and the second coil 322 with current $I_2$ is used for precision control of the state of the reservoir and lens (e.g., the first coil 316 provides for gross adjustments of the tuning while the second coil 322 allows for fine tuning). The currents applied to the first and second coils 316, 322 can be varied depending upon the embodiment to a variety of different levels, and the two currents $I_1$ and $I_2$ can have the same or different levels as well as the same or different polarities. In the embodiment of FIG. 19A, the second coil 322 has a lesser density than the first coil 316. Such relative densities of the coils could be desirable so as to achieve ultra fine scale control by controlling the second coil current $I_2$. In other embodiments, the first and second coils 316, 322 can have similar density in terms of turns per length.

Desired effects can be achieved both by varying the relative densities of the coils, and by varying the currents in the different coils (also, in some cases, the same effects can be achieved by varying either the coil densities or the coil currents). For example, the current $I_1$ could be set to 100 mA to achieve enough force to obtain a strong lens focal power and, simultaneously, the current $I_2$ could be varied over a small current range (e.g., 1 mA) to assure that the best optical image quality is obtained. Such current values might be appropriate for an auto-focusing imaging system where fine adjustment of the lens focal distance was needed after the view finder had located an object of interest. Further for example, if more accurate control was needed (e.g., to achieve 0.1% accuracy), different electric wiring densities could be employed for the two coils 316, 322. Since magnetic force is proportional to the square of the wiring density, reduction of the wiring density by a factor of 5 can improve the controllability by a factor of 25 assuming the same currents.

Another desirable feature of at least some embodiments of tunable lens systems is to provide the ability of controlling the lens to attain both convex and concave lens shapes. That is, in such embodiments, it is desirable that the actuator (or actuators) be capable of causing appropriate amounts of fluid to flow from the reservoir to the lens cavity so as to create a convex lens (and to shorten the focal distance of a convex lens), and also to flow from the lens cavity to the reservoir to create a concave lens having a desired (negative) focal distance. Applications in which such a capability is desirable include, for example, imaging systems with optical zoom capabilities. One manner of achieving such bidirectional tuning is to replace one of the two pieces of ferromagnetic material 312, 314 of FIGS. 18 and 19A with a permanent magnet (not shown). When the direction of the current flow is reversed, a repelling force (rather than an attractive force) is generated to push the permanent magnet away, such that the bellow reservoir 302 expands and fluid is drawn from the lens cavity 318 into the reservoir so as to potentially create a concave lens.

Although simple in design, the above-described implementation involving a permanent magnet in at least some circumstances can have certain drawbacks. For example, in some cases the permanent magnet may tend to magnetize the remaining piece of ferromagnetic material, such that the operation of the actuator may change over time. Also, in some cases, the repelling force from a reversed current may have to overcome an attractive force between the permanent magnet and the remaining piece of ferromagnetic metal, making the device more power hungry and the tuning range narrower.

FIG. 19B shows a tunable lens system 330 that is an alternative to that of FIG. 19A and that does not suffer from these concerns. In the embodiment of FIG. 19B, the coils 316, 322 of FIG. 19A are replaced with first and second coils 332 and 334. Also in contrast to the implementation of FIG. 19A where the coil 322 surrounds concentrically the coil 316, the first and second coils 332, 334 respectively are positioned along different axial segments of the bellow reservoir 302.

Typically, the first and second coils 332, 334 are electrically isolated from one another and are connected to separate currents represented by $I_1$ and $I_2$. When both currents are of the same direction, the tunable lens structure 330 behaves in substantially the same manner as the tunable lens structure 300 of FIG. 18, with the volume of the bellow reservoir 302 being reduced with increasing amounts of current being applied to the coils 332, 334, so as to shorten the focal distance of a convex lens. However, when the two currents are of opposite directions, the two pieces of ferromagnetic material 312, 314 produce a repelling force tending to expand the volume of the bellow reservoir 302, resulting in a concave lens.

All of the pumping systems described above can be employed in conjunction with a wide variety of fluidic media. Nevertheless, pumping systems of the first class (e.g., those described with respect to FIGS. 5A-17C) employing nozzle/diffuser components and actuator(s) with vibrational component(s) are more suitable for lenses using low (to intermediate) viscosity fluid, while pumping systems of the second class (e.g., those described with respect to FIGS. 18A-19B) employing volumetrically-controllable reservoirs are more suitable for intermediate or high viscosity lens fluid. Low viscosity fluid here refers to fluid having a viscosity comparable to that of water (about 1 centipoise or 0.01 Nt·sec/m$^2$), while high viscosity fluid refers to fluid having a viscosity that is typically more than 10 times greater than that of water. Besides the optical properties of lens fluid, viscosity is another important factor for lens system design. In general, low viscosity fluid yields a higher tuning speed and lower power consumption, whereas higher viscosity fluid yields superior lens stability and controllability Although the above discussion sets forth a variety of different embodiments of pumping systems and a variety of different embodiments that employ such pumping systems (along with methods of their manufacture), the present invention is intended to encompass a variety of other pumping systems, tunable lens systems, and related manufacturing processes in addition to those disclosed above. For example, while various embodiments described above involve tunable lens systems in which one or more pumping systems, reservoirs, and/or lenses are integrated on a single microfluidic chip or similar structure (and related methods of integrating the fluidic lenses and the above defined "pumps" in a monolithic or hybrid manner), the present invention is also intended to encompass embodiments in which those devices are not so integrated.

Also for example, while two classes of pumping systems are primarily described above (e.g., those employing nozzle/diffuser component(s) and vibrational component(s) to drive fluid between a reservoir and lens cavity, and those employing coil(s) to expand/contract a reservoir), the present invention is also intended to encompass other pumping system designs employing similar structures that differ from the disclosed designs. In some circumstances, for example, the nozzle and diffuser structures could be modified in their shapes from those disclosed above. Also, in some circumstances the pump cavity could have more than one vibrational component arranged around it (e.g., two vibrational components could be positioned on opposite sides of the pump cavity.

Further for example, while the designs of tunable lens systems and pumping systems shown in FIGS. 18, 19A and 19B employ arrangements of coil(s) and pieces of ferromagnetic material (or other magnetic devices), still other arrangements are also possible. In one such alternate embodiment, a coil or loop of wire could be attached to the bellow reservoir 302. In still further exemplary embodiments, the tunable lens systems could employ other structures in place of the bellow reservoir 302, such as a balloon-type component. Additionally, while the above-described embodiments are "closed" fluidic systems in which the pumping systems merely create fluidic pressure differences between a lens cavity and a reservoir cavity (or merely effect changes in the pressure within the lens cavity) rather than provide steady or continual fluid flow, some alternate embodiments of the present invention could employ pumping systems that provide continual fluid flow and/or are "open" fluidic systems.

Additionally, it will be understood that in many embodiments the actuation components used in the pumping systems (e.g., the vibration components or coils) will either include or be in communication with various other controllers or control components or devices including, for example, microprocessors, microcomputers, programmable logic devices (PLDs) and the like, which will determine the behavior of those actuation components. Also, in some embodiments, input and/or output devices will allow for human operators (or other operators, including mechanical operators/machines) to send/determine control signals, or to monitor operation of the actuation components. Further, in some cases, the operation of the pumping systems/actuation components will be determined at least in part based upon feedback signals concerning, for example, the pressure(s) within reservoirs, lens cavities or other cavities, or other considerations. Also in at least some such embodiments, control signals could be provided from a remote control source, either by way of wired communication linkages (or networks) or wireless communications techniques.

At least some (if not all) of the pumping systems described above are capable of more precisely and rapidly effecting changes in lens properties than is possible using conventional pumping systems, and/or are of less weight or bulkiness (even to the point of being comparable in weight and size to the lenses themselves) than conventional systems. As a result, the tunable lens systems employing these pumping systems are particularly suitable for use in applications that prefer small form factors such as cameras in cell phones, PDAs, etc. Additionally, many of the embodiments discussed above are particularly applicable within zoom lens systems in cameras and the like to provide variable zooming capability. These embodiments are useful in such applications because they can provide variable zooming without the need for complicated mechanical devices for physically moving multiple lenses toward or away from one another, without the need for separate mechanical devices for generating pressure differences that deform and dynamically tune the lenses, and without the need for separate bulky reservoir units to provide sources of fluid to enable lens deformation.

Figure 20:
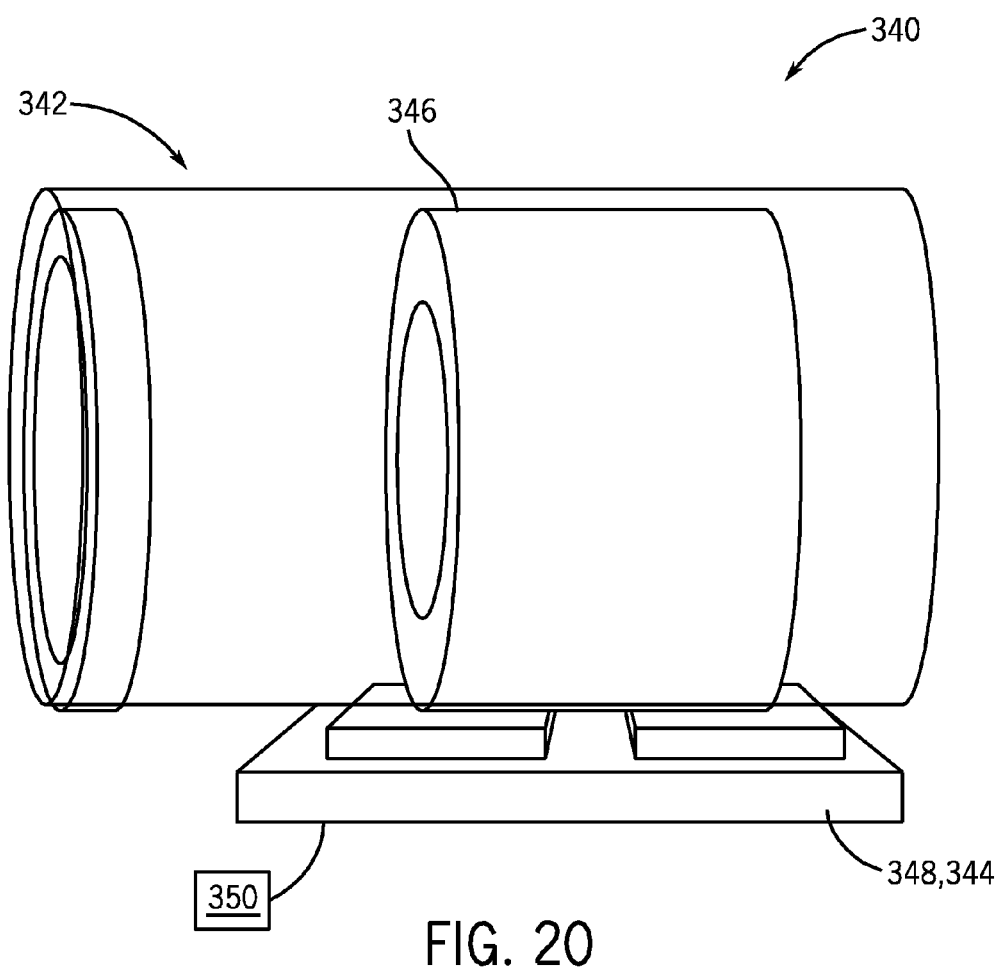
FIG. 20 illustrates in schematic form an exemplary zoom-lens camera system, in which various tunable lens systems such as those in accordance with various embodiments of the present invention can be employed.

FIG. 20 shows schematically how one or more tunable lens systems in accordance with some embodiments of the present invention can be incorporated into a standard camera C-mount (or similar optic package) 340. As shown, one or more fluidic lenses 342 themselves are a lens package mounted inside the C-mount 340, with (in the present embodiment) at least one of the fluidic lenses 342 (in this case, the zoom lens) being formed on a zoom-lens chip 346.

Also in the present embodiment, one or more fluidic circuits 344 including one or more pumping systems (and possibly one or more reservoirs) are placed outside the C-mount 340 on a fluidic circuit chip 348. The reservoirs/pumping systems located on such a fluidic circuit chip 348 can be coupled to the lenses on the C-mount 340 by way of ports such as the port 199 described with respect to FIGS. 10A-10C. Also, fluid transfer between the lenses and the fluid circuits can be achieved via fluid tubes or pipes connecting the two parts. Additionally, in the embodiment shown, a control component (e.g., a microprocessor or other controller) 350 is shown to be coupled to the fluidic circuit chip 348. The control component 350 is capable of providing control signals to actuator(s) on the fluidic circuit chip 348, e.g., vibrational component(s) or electromagnetic actuator(s) such as those described above.

At the same time, the present invention is also intended to encompass the implementation of the above-described tunable lens systems and/or pumping systems (or similar tunable lens systems or pumping systems) in a variety of other applications and circumstances. These include, for example, a wide variety of other electronic and other devices that employ one or more lenses, such as other types of cameras, microscopes, video monitors, video recorders, copy machines, scanners, cell phones, personal digital assistants (PDAs), eyeglasses, medical implants, magnifying glasses, and optical probes. Further, various embodiments of the present invention (and particularly those which combine tunable fluidic lenses with integrated fluidic circuits with special fluidic channel and actuator designs) allow for the creation of compact and highly functional optic lenses and lens systems for a variety of applications such as, for example, lenses and zoom lenses for imaging, surveillance, microscopes, medical instrumentation, and eyeglasses.

It is specifically intended that the present invention not be limited to the embodiments and illustrations contained herein, but include modified forms of those embodiments including portions of the embodiments and combinations of elements of different embodiments as come within the scope of the following claims.

We claim:

1. A tunable lens system comprising:
   a reservoir having at least one flexible wall;
   a first actuator coupled in relation to the reservoir, the actuator including a first coil that surrounds at least a portion of the reservoir and that is capable of generating a first electromagnetic field and a second coil capable of generating a second electromagnetic field, wherein the first electromagnetic field tends to cause a reduction in a volume of the reservoir, and the second electromagnetic field tends to cause an expansion in the volume;
   a terminal at which is located at least one of an integrated fluidic lens and a port configured to be coupled to an external fluidic lens, wherein the terminal is coupled to at least one of the reservoir and the actuator, and wherein at least one of the actuator and a first pumping system including the actuator is capable of causing fluid to be moved at least one of from the reservoir toward the terminal, and from the terminal toward the reservoir.

2. The lens system of claim 1, further comprising the pumping system that includes the actuator, and wherein the pumping system is coupled between the reservoir and the terminal.

3. The lens system of claim 2, wherein the pumping system further includes at least one flow directing channel having a form of one of a nozzle and a diffuser.

4. The lens system of claim 3, wherein the pumping system includes two flow directing channels, wherein one of the flow directing channels is a nozzle the other of the flow directing channels is a diffuser.

5. The lens system of claim 4, wherein the diffuser is coupled between the reservoir and the actuator, and the nozzle is coupled between the actuator and the terminal, and wherein the pumping system is comparable in weight and size to the lens.

6. The lens system of claim 3, wherein the at least one flow directing channel has a horn-shaped geometry that is at least one of substantially conical and substantially wedge-shaped, and wherein the fluid has a viscosity of a low to intermediate level.

7. The lens system of claim 1, wherein the terminal is the integrated fluidic lens having an additional flexible wall.

8. The lens system of claim 7, wherein the additional flexible wall at least one of expands outward when the fluid is pumped by the actuator and contracts inward when the fluid is pumped by the actuator.

9. The lens system of claim 8, wherein the integrated fluidic lens serves as a convex lens when the additional flexible wall expands outward and serves as a concave lens when the additional flexible wall contracts inwards.

10. The lens system of claim 7, wherein the additional flexible wall of the integrated fluidic lens is positioned between the fluid and at least one of air and another fluid.

11. The lens system of claim 1, further comprising at least one of a second actuator and a second pumping system including the second actuator.

12. The lens system of claim 11, further comprising the second pumping system, wherein each of the first and second pumping systems includes at least one of a nozzle and a diffuser that links the respective first and second actuators at least indirectly with the reservoir, and at least one of a nozzle and a diffuser that links the respective first and second actuators at least indirectly with the terminal.

13. The lens system of claim 11, further comprising at least one of a third actuator and a third pumping system including the third actuator.

14. The lens system of claim 1, wherein the reservoir is integrated with the actuator on a single component.

15. The lens system of claim 1, wherein the reservoir is at least one of a substantially cylindrical bellow and a substantially spherical balloon.

16. The lens system of claim 15, wherein the reservoir is the substantially cylindrical bellow, and wherein the cylindrical bellow includes at least two components at different axial locations along the bellow that interact with a magnetic field produced the by first coil so as to produce a change in a volume of the bellow.

17. The lens system of claim 16, wherein the components include a first component that is a first piece of ferromagnetic material and a second component that is at least one of a second piece of ferromagnetic material and a permanent magnet, and wherein the fluid has a viscosity of a high to intermediate level.

18. The lens system of claim 1, wherein the second coil is located concentrically around the first coil.

19. The lens system of claim 18, wherein the first coil is used to achieve gross adjustments in a volume of the reservoir, and the second coil is used to achieve fine adjustments in the volume.

20. The lens system of claim 1, wherein the second coil is located axially adjacent to the first coil.

21. The lens system of claim 1, wherein the first coil has a different density than the second coil.

22. The lens system of claim 1, wherein the actuator includes at least one electromagnetic component mounted on at least one of the reservoir and mounted adjacent to the reservoir.

23. The lens system of claim 1, wherein the lens system is configured to be mounted within or in combination with at least one of a pair of eyeglasses, a camera, microscope, a video monitor, a video recorder, a copy machine, a scanner, a zoom lens system, a cell phone, a personal digital assistant, a computer, and a magnifying glass.

24. The lens system of claim 1, further comprising a controller connected at least indirectly with the actuator.

25. A zoom lens system comprising at least one lens system according to claim 1.

26. A microchip on which is integrated the lens system of claim 1, wherein the lens system includes the integrated fluidic lens.

27. The lens system of claim 1, wherein operation of the actuator causes fluid to be pumped from the reservoir to the lens, thus effecting a change to at least one of a lens focal distance, a lens magnification, and a lens orientation.

28. A structure capable of being implemented in a fluidic adaptive lens system, the structure comprising:
a plurality of walls at least partially defining a plurality of open-sided cavities;
at least one flexible membrane being coupled to at least some of the plurality of walls so as to additionally define the plurality of open-sided cavities, wherein at least two of the cavities are connected with one another, and wherein each of the cavities as additionally defined by the at least one flexible membrane is capable of being implemented as at least part of at least one of a fluidic adaptive lens, a fluidic reservoir, and a pump cavity of an actuator;
a first fluidic adaptive lens including at least a first of the cavities;
a second fluidic adaptive lens including at least a second of the cavities;
a first actuator including at least a third of the cavities;
a second actuator including at least a fourth of the cavities; and
a plurality of channels linking the actuators with the fluidic adaptive lenses.

29. The structure of claim 28, wherein at least one intermediate structure is positioned between two of the cavities, and wherein the at least one intermediate structure is at least partly optically transparent.

30. The structure of claim 29, wherein the two cavities are positioned on opposite sides of the at least one intermediate structure and aligned with one another, and wherein the at least one intermediate structure includes at least one segment of transparent rigid material, and at least one transparent wafer.

31. The structure of claim 28, wherein the at least two cavities are connected with one another by way of at least one of a nozzle and a diffuser.

32. A tunable lens system comprising:
a reservoir having at least one flexible wall;
an actuator coupled to the reservoir, wherein the actuator is a micropump including a piezoelectric component, a pumping cavity, and at least one membrane extending between the piezoelectric component and the pumping cavity, and wherein the piezoelectric component is capable of imparting force into the pumping cavity via the at least one membrane;
a terminal at which is located at least one of an integrated fluidic lens and a port configured to be coupled to an external fluidic lens, wherein the terminal is coupled to at least one of the reservoir and the actuator, and wherein at least one of the actuator and a first pumping system including the actuator is capable of causing fluid to be moved at least one of from the reservoir toward the terminal, and from the terminal toward the reservoir.

33. A structure capable of being implemented in a fluidic adaptive lens system, the structure comprising:
a plurality of walls at least partially defining a plurality of open-sided cavities;
at least one flexible membrane being coupled to at least some of the plurality of walls so as to additionally define the plurality of open-sided cavities, wherein at least two of the cavities are connected with one another, and wherein each of the cavities as additionally defined by the at least one flexible membrane is capable of being implemented as at least part of at least one of a fluidic adaptive lens, a fluidic reservoir, and a pump cavity of an actuator;
a first reservoir including at least a first of the cavities;
a second reservoir including at least a second of the cavities;
a first actuator including at least a third of the cavities;
a second actuator including at least a fourth of the cavities; and
a plurality of channels linking the actuators with the reservoirs.

34. The structure of claim 33, wherein at least one intermediate structure is positioned between two of the cavities, and wherein the at least one intermediate structure is at least partly optically transparent.

35. The structure of claim 34, wherein the two cavities are positioned on opposite sides of the at least one intermediate structure and aligned with one another, and wherein the at least one intermediate structure includes at least one segment of transparent rigid material, and at least one transparent wafer.

36. The structure of claim 33, wherein the at least two cavities are connected with one another by way of at least one of a nozzle and a diffuser.

* * * * *